(12) United States Patent
Nishimura et al.

(10) Patent No.: US 12,341,455 B2
(45) Date of Patent: Jun. 24, 2025

(54) POWER CONVERSION APPARATUS

(71) Applicant: DENSO CORPORATION, Kariya (JP)

(72) Inventors: Syusei Nishimura, Nisshin (JP);
Masahito Fujieda, Nisshin (JP); Keiya Tani, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

(21) Appl. No.: 18/200,216

(22) Filed: May 22, 2023

(65) Prior Publication Data

US 2023/0327596 A1 Oct. 12, 2023

Related U.S. Application Data

(63) Continuation of application No. PCT/JP2021/044430, filed on Dec. 3, 2021.

(30) Foreign Application Priority Data

Dec. 15, 2020 (JP) .................................. 2020-207823

(51) Int. Cl.
*H02P 27/06* (2006.01)
*B60L 50/51* (2019.01)
(Continued)

(52) U.S. Cl.
CPC .............. *H02P 27/06* (2013.01); *B60L 50/51* (2019.02); *H02J 7/0013* (2013.01);
(Continued)

(58) Field of Classification Search
CPC ...... H02P 27/06; B60L 50/51; B60L 2200/10; B60L 2200/32; H02J 7/0013; H02J 7/0048; H02M 7/537
See application file for complete search history.

(56) References Cited

U.S. PATENT DOCUMENTS 8,054,025 B2 * 11/2011 Oyobe .................... H02J 7/02
180/65.21
2011/0031922 A1 * 2/2011 Sakai .................... H02P 27/08
318/519

(Continued)

FOREIGN PATENT DOCUMENTS

CN 105762434 A 7/2016
JP 2006-288170 A 10/2006
(Continued)

*Primary Examiner* — Zoheb S Imtiaz
(74) *Attorney, Agent, or Firm* — Oliff PLC

(57) ABSTRACT

A power conversion apparatus includes a rotating electrical machine equipped with star-connected windings and an inverter equipped with series-connected units made up of upper arm switches and lower arm switches. The power conversion apparatus also includes a connecting path which electrically connects a negative terminal of a first electrical storage, a positive terminal of a second electrical storage connected in series with the first electrical storage, and a neutral point of the windings together, a connecting switch which is disposed in the connecting path, and a determiner which works to determine whether the connecting switch is required to be turned on, and a controller which turns on the connecting switch when it is determined by the determiner that the connecting switch is required to be turned on to execute a switching control operation on the upper arm switches and the lower arm switches.

12 Claims, 18 Drawing Sheets

(51) Int. Cl.
*H02J 7/00* (2006.01)
*H02M 7/537* (2006.01)

(52) U.S. Cl.
CPC ......... *H02M 7/537* (2013.01); *B60L 2200/10* (2013.01); *B60L 2200/32* (2013.01); *H02J 7/0048* (2020.01)

(56) References Cited

U.S. PATENT DOCUMENTS

2014/0132197 A1* 5/2014 Kanazawa ............... H02K 3/28
310/198
2021/0351684 A1 11/2021 Nishimura et al.

FOREIGN PATENT DOCUMENTS

JP 2013-187919 A 9/2013
JP 2013-247690 A 12/2013

\* cited by examiner

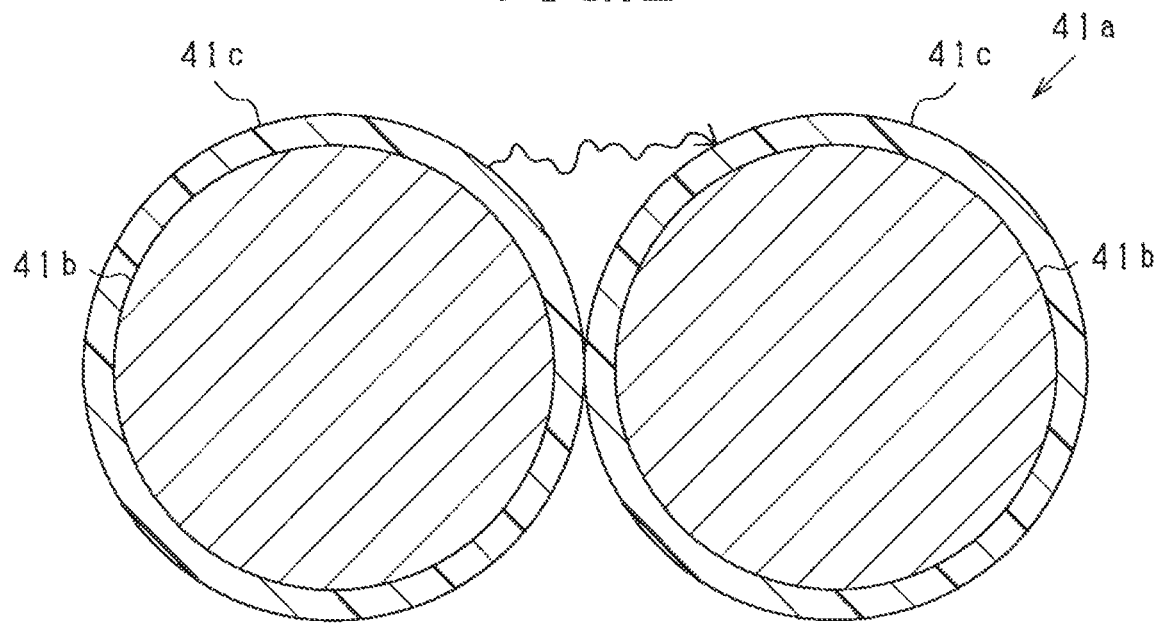

<DURING STOP OF VEHICLE>

<IN OPERATION OF ROTATING ELECTRICAL MACHINE>

FIG.26(a)
COMPARATIVE EXAMPLE
(AMPLITUDE OF IM* IS NOT INCREASED)
FIG.26(b)
THIS EMBODIMENT
(AMPLITUDE OF IM* IS INCREASED)
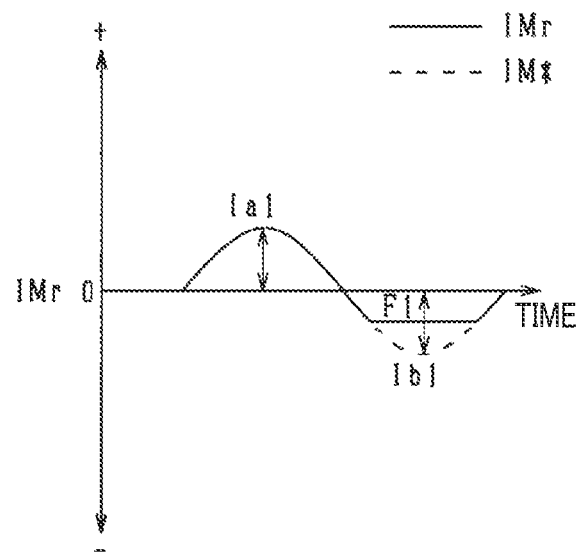
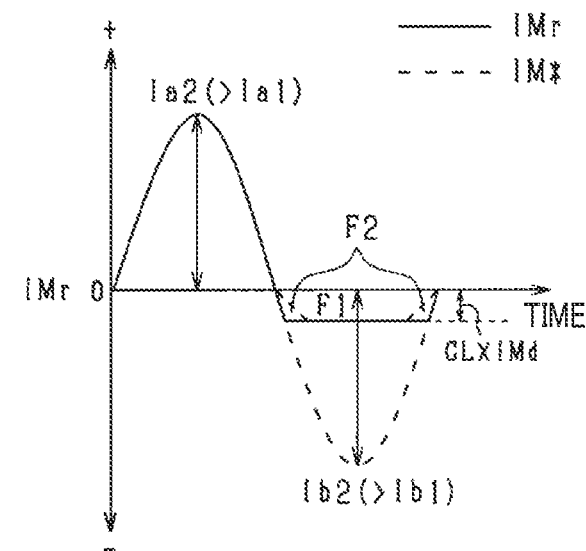
FIG.27
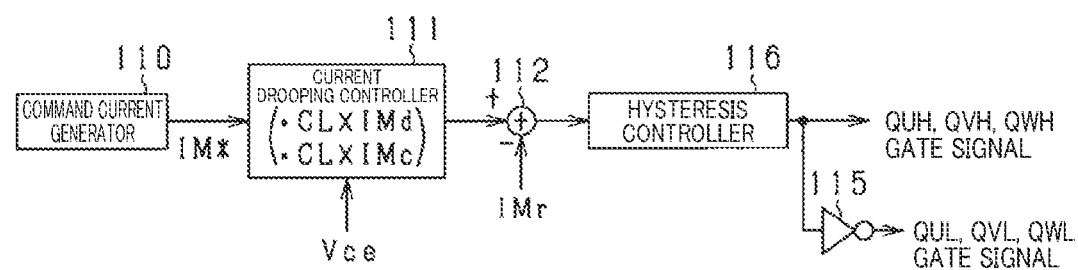

POWER CONVERSION APPARATUS

CROSS REFERENCE TO RELATED DOCUMENT

The present application claims the benefit of priority of Japanese Patent Application No. 2020-207823 filed on Dec. 15, 2020, the disclosure of which is incorporated in its entirety herein by reference.

TECHNICAL FIELD

This disclosure relates generally to a power conversion apparatus.

BACKGROUND ART

A power conversion apparatus is known which includes a rotating electrical machine equipped with windings and an inverter equipped with series-connected units made up of upper and lower arm switches. The power conversion apparatus executes a variety of operations to meet requirements in a switching control task for controlling operations of the upper and lower arm switches. For instance, a power conversion apparatus, as taught in the patent literature 1 listed below, works to execute the switching control task as a function of atmospheric pressure around a rotating electrical machine in order to ensure the electrical insulation of the rotating electrical machine.

PRIOR ART DOCUMENT

Patent Literature

Patent Literature 1: Japanese Patent First Publication No. 2006-288170

SUMMARY OF THE INVENTION

The power conversion apparatus needs to have an increased size in order to meet the requirements in the switching control task. For instance, an electrical insulation distance between windings of a rotating electrical machine needs to be increased in order to ensure a degree of electrical insulation required by the rotating electrical machine, which results in an increase in total size of the rotating electrical machine. There is still room for technical improvement on the structure of the rotating electrical machine in order to satisfy the above disadvantage.

This disclosure was made in order to solve the above problem. It is a principal object of this disclosure to provide a power conversion apparatus which is enabled to be reduced in size thereof.

The first structure in this disclosure provides a power conversion apparatus which comprises: (a) a rotating electrical machine which includes windings which are star-connected; (b) an inverter which includes series-connected units equipped with upper arm switches and lower arm switches; (c) a connecting path which electrically connects a negative terminal of a first electrical storage, a positive terminal of a second electrical storage connected in series with the first electrical storage, and a neutral point of the windings together; (d) a connecting switch which is disposed in the connecting path and works to achieve an electrical connection of the negative terminal of the first electrical storage, the positive terminal of the second electrical storage, and the neutral point when the connecting switch is turned on and also block the electrical connection of the negative terminal of the first electrical storage, the positive terminal of the second electrical storage, and the neutral point when the connecting switch is turned off; (e) a determiner which works to determine whether the connecting switch is required to be turned on; and (f) a controller which turns on the connecting switch when it is determined by the determiner that the connecting switch is required to be turned on to execute a switching control operation on the upper arm switches and the lower arm switches.

The first structure of the power conversion apparatus, as described above, includes the connecting path, the connecting switch, and the determiner. The connecting path electrically connects the negative terminal of the first electrical storage, the positive terminal of the second electrical storage, and the neutral point of the windings. The connecting switch is disposed in the connecting path. The determiner works to determine whether the connecting switch should be turned on or off in order to meet requirements needed in executing the switching control operation. When the determiner determines that the connecting switch should be turned on, the connecting switch is turned on to perform the switching operation on the upper and lower arm switches. This enables the requirements in the switching control operation to be satisfied without need for additional parts of the power conversion apparatus, which also enables the overall size of the power conversion apparatus to be reduced.

In the second structure, when determining that a degree of partial discharge occurring in a first phase winding that is one of the windings is greater than a permissible value, the determiner executes a determination task to determine that the connecting switch is required to be turned on.

There is a probability that an increase in degree of the partial discharge at one of the windings above a permissible value thereof may result in deterioration of that winding, which leads to reduction in electrical insulation of the windings. In order to alleviate such a problem, it is possible to increase an insulating distance between the windings. This, however, results in an increased total size of the rotating electrical machine.

In order to alleviate the above problem, the second structure determines whether the degree of partial discharge occurring in the first phase winding that is one of the windings is greater than the permissible value. The second structure turns on or off the connecting switch based on results of the above determination. When the connecting switch is in an off-state, a voltage difference is present that is equivalent to a fraction of a terminal voltage appearing at a series-connected assembly of the first electrical storage and the second electrical storage which are connected in series with each other. A maximum value of the fraction is higher than half the terminal voltage developed at the series-connected assembly of the first and second electrical storages. Alternatively, when the connecting switch is turned on, the negative terminal of the first electrical storage, the positive terminal of the second electrical storage, and the neutral point of the windings are connected together. The turning on or off of the upper and lower arm switches causes the terminal voltage appearing at the first electrical storage or second electrical storage to be applied to each of the windings. Consequently, when the connecting switch is turned on, it results in a decrease in voltage difference between adjacent sections (i.e., turns) of one of the windings which is more than that when the connecting switch is turned off. This decreases the degree of partial discharge generated at one of the windings, thereby enabling the insulating distance between adjacent sections of the windings to be decreased. This enables the overall size of the rotating electrical machine to be reduced.

The second structure is capable of decreasing the voltage difference between adjacent sections of each of the windings without reducing voltage delivered to the inverter. This ensures the stability of output from the rotating electrical machine.

The third structure which is a modification of the first structure also includes a voltage obtainer which works to derive a voltage parameter which indicates a terminal voltage developed at each of the first electrical storage and the second electrical storage or correlates with the terminal voltage. When the higher of the voltage parameters derived by the voltage obtainer is lower than or equal to a voltage threshold value, the determiner determines that the connecting switch is required to be turned on. When determining that the connecting switch is required to be turned on, the controller turns on the connecting switch to create a flow of electrical current between the first electrical storage and the second electrical storage through the inverter, the windings, and the connecting path, thereby executing the switching control operation to transfer electrical energy from one of the first electrical storage to the other.

In the past, a power conversion apparatus has executed a control task to exchange electrical energy among batteries. Such a control task requires a dedicated switching device and a reactor to exchange electrical energy among the batteries, thus resulting in an increase in parts of the power conversion apparatus, which may increase the overall size of the power conversion apparatus.

The above-described third structure is, however, designed to derive the voltage parameter of each of the first electrical storage and the second electrical storage. When the higher of the voltage parameters is lower than the voltage threshold value, it is determined that the connecting switch is required to be turned on. The switching control operation is then executed to transfer electrical energy from one of the first electrical storage and the second electrical storage to the other through the windings and the inverter with the connecting switch kept on. This enables the overall size of the power conversion apparatus to be reduced.

In the above structure, the energy exchange is achieved with the voltage parameters of the first and second storages being lowered. Usually, the lower the voltage parameters of the first and second electrical storages, the smaller a ripple current flowing through the windings will be. The smaller the ripple current, the lower the core loss occurring in the rotating electrical machine. The third structure is, therefore, capable of reducing the loss of electrical energy exchanged between the first and second electrical storages.

The fourth structure which is a modification of the first structure also includes a voltage obtainer which works to derive a voltage parameter which indicates a terminal voltage developed at each of the first electrical storage and the second electrical storage or correlates with the terminal voltage. The determiner determines whether there is a control request to create a flow of electrical current between the first electrical storage and the second electrical storage. When determining that there is the control request, the determiner concludes that the connecting switch is required to be turned on. When it is determined by the determiner that the connecting switch is required to be turned on, and the voltage parameter of each of the first electrical storage and the second electrical storage derived by the voltage obtainer is determined to lie in a reference voltage range, the controller executes the switching control operation with the connecting switch kept on to produce a flow of electrical current between the first electrical storage and the second electrical storage through the inverter, the windings, and the connecting path. When it is determined that the connecting switch is required to be turned on, and a minimum value of the voltage parameters of the first electrical storage and the second electrical storage is determined to be lower than a lower limit of the reference voltage range, the controller executes the switching control operation to bring a discharge electrical current, as discharged from an overdischarge protecting target that is one of the first electrical storage and the second electrical storage which produces the minimum value of the voltage parameters, to be lower than that when the voltage parameters of the first electrical storage and the second electrical storage lie in the reference voltage range. Alternatively, when it is determined that the connecting switch is required to be turned on, and a maximum value of the voltage parameters of the first electrical storage and the second electrical storage is determined to be higher than an upper limit of the reference voltage range, the controller executes the switching control operation to bring a charge electrical current, as charging an overcharge protecting target that is one of the first electrical storage and the second electrical storage which produces the maximum value of the voltage parameters, to be lower than that when the voltage parameters of the first electrical storage and the second electrical storage lie in the reference voltage range.

In the past, when the temperature of batteries is undesirably low, a flow of electrical current is applied through the batteries. This, however, has a risk that a terminal voltage developed at each of the batteries may be out of a voltage range required to ensure the reliability in operation of a corresponding one of the batteries, thereby resulting in deterioration thereof.

In order to alleviate the above problem, when it is determined that the connecting switch is required to be turned on, the fourth structure works to turn on or off the upper and lower arm switches to apply a flow of electrical current to the first electrical storage and the second electrical storage through the inverter, the windings, and the connecting path with the connecting switch kept on.

In the above structure, when it is determined that the connecting switch is required to be turned on, and the minimum value of the voltages at the first electrical storage and the second electrical storage is determined to be below the lower limit of the reference voltage range, the amount of current discharged from the overdischarge protecting target is decreased. Alternatively, when it is determined that the connecting switch is required to be turned on, and the maximum value of the voltages at the first electrical storage and the second electrical storage is determined to be above the upper limit of the reference voltage range, the amount of current charging the overcharge protecting target is decreased. This eliminates a risk that the voltage developed at each of the overdischarge protecting target and the overcharge protecting target may be out of a voltage range needed to ensure the reliability in operation of the first and second electrical storages, thereby avoiding the deterioration of the first electrical storage and second electrical storage.

BRIEF DESCRIPTION OF THE DRAWINGS

The present disclosure will be understood more fully from the detailed description given hereinbelow and from the accompanying drawings of the preferred embodiments of the invention.

In the drawings:

FIG. 2 is a cross sectional view of each winding;

FIG. 3 is a view which represents a relation among a partial discharge inception voltage, atmospheric pressure, and temperature;

FIG. 4 is a view which represents a relation among a winding voltage, a terminal voltage at a battery, and a phase current flowing through a winding;

FIG. 6 is a view which shows a maximum value of a winding voltage when a connecting switch is turned on;

FIG. 11($b$) is a circuit diagram which demonstrates an equivalent circuit in the second embodiment;

FIGS. 26($a$) and 26($b$) are time charts which demonstrate examples of temperature elevating control tasks;

FIG. 27 is a block diagram which illustrates functional blocks executing a temperature elevating control task in a modification of the third embodiment.

MODE FOR CARRYING OUT THE INVENTION

First Embodiment

The first embodiment in which a power conversion apparatus according to this disclosure is embodied will be described below with reference to the drawings. The power conversion apparatus in this embodiment is mounted on, for example, electrical vehicles or hybrid vehicles.

Figure 1:
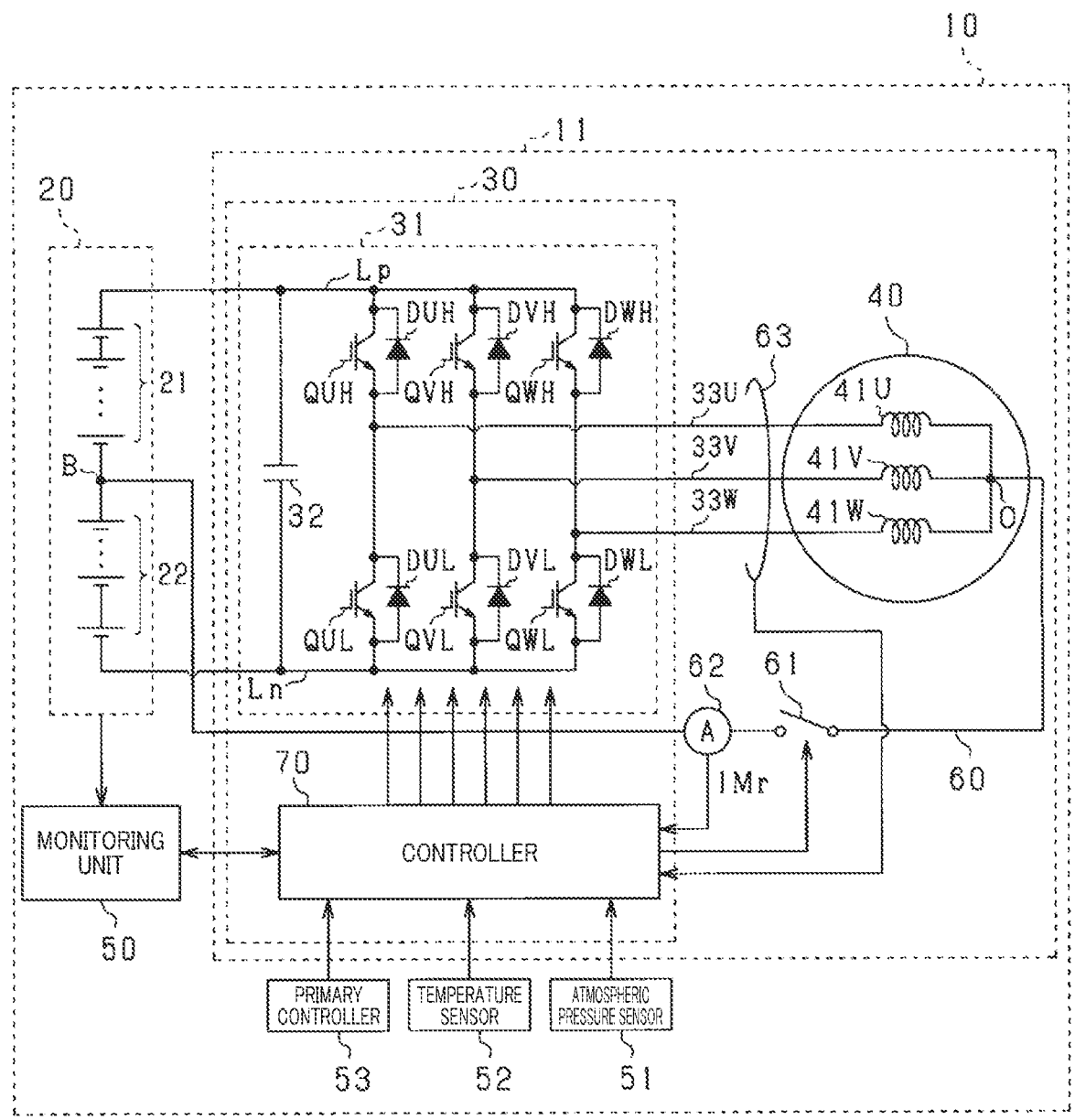
FIG. 1 is a structural view which illustrates a power conversion system according to the first embodiment.

The power conversion system 10 is, as can be seen in FIG. 1, equipped with the power conversion apparatus 11. The power conversion apparatus 11 includes the inverter 30 and the rotating electrical machine 40. The rotating electrical machine 40 is designed as a three-phase synchronous machine equipped with a stator winding made up of the U-phase, V-phase, and W-phase windings 41U, 41V, and 41W which are electrically connected together in the form of Y-connection or star-connection. The phase windings 41U, 41V, and 41W are spaced 120 degrees in electrical angle apart from each other. The rotating electrical machine 40 is implemented by, for example, a permanent magnet synchronous machine. In this embodiment, the rotating electrical machine 40 works as a main power source to move the vehicle.

The inverter 30 is equipped with the switching device 31. The switching device 31 includes series-connected units, one for each of the three-phases, which are made of the upper arm switches QUH, QVH, and QWH and the lower arm switches QUL, QVL, and QWL. In this embodiment, each of the switches QUH, QVH, QWH, QUL, QVL, and QWL is made of a voltage-controlled semiconductor switch, and more specifically made of an IGBT. Each of the switches QUH, QVH, QWH, QUL, QVL, and QWL, therefore, has a collector as a high-potential terminal and an emitter as a low-potential terminal. The switches QUH, QVH, QWH, QUL, QVL, and QWL have the diodes DUH, DVH, DWH, DUL, DVL, and DWL connected in reverse parallel thereto. The diodes DUH, DVH, DWH, DUL, DVL, and DWL work as freewheel diodes.

The U-phase winding 41U is connected at a first end thereof to the emitter of the U-phase upper arm switch QUH and the collector of the U-phase lower arm switch QUL through the U-phase conductor 33U implemented by a bus bar. The V-phase winding 41V is connected at a first end thereof to the emitter of the V-phase upper arm switch QVH and the collector of the V-phase lower arm switch QVL through the V-phase conductor 33V implemented by a bus bar. Similarly, the W-phase winding 41W is connected at a first end thereof to the emitter of the W-phase upper arm switch QWH and the collector of the W-phase lower arm switch QWL through the W-phase conductor 33W implemented by a bus bar. The U-phase, V-phase, and W-phase windings 41U, 41V, AND 41W are also connected at second ends thereof to the neutral point O. In this embodiment, the phase-windings 41U, 41V, and 41W are designed to be identical in number of turns with each other, so that the phase-windings 41U, 41V, and 41W have inductances equal to each other.

Each of the upper arm switches QUH, QVH, and QWH is connected at the collector to a positive terminal of the assembled battery 20 through the positive-side bus bar Lp. Each of the lower arm switches QUL, QVL, and QWL is connected at the emitter to a negative terminal of the assembled battery 20 through the negative-side bus bar Ln.

The power conversion apparatus 11 is equipped with the capacitor 32 which connects the positive-side bus bar Lp and the negative-side bus bar Ln together. The capacitor 32 may be built in the inverter 30 or alternatively installed outside the inverter 30.

The assembled battery 20 is made of cells connected in series with each other to develop several hundred volts at a terminal thereof. In this embodiment, the cells of the assembled battery 20 are identical in terminal voltage (e.g., voltage rating) with each other. The cells may be implemented by secondary cells, such as lithium-ion cells.

Specifically, the assembled battery 20 is made up of the first storage battery 21 and the second storage battery 22. The first storage battery 21 is made of an assembly of the cells connected in series with each other and arranged at a high-potential side. The second storage battery 22 is made of an assembly of the cells connected in series with each other and arranged at a low-potential side. In brief, the assembled battery 20 is formed by two battery units. In this embodiment, the first storage battery 21 and the second storage battery 22 are identical in number of the cells with each other, so that the terminal voltage (e.g., voltage rating) at the first storage battery 21 is equal to that at the second storage battery 22. The first storage battery 21 will also be referred to merely as a first storage battery. The second storage battery 22 will also be referred to merely as a second storage battery.

In the assembled battery 20, the intermediate terminal B is connected to the negative terminal of the first storage battery 21 and the positive terminal of the second storage battery 22.

The power conversion apparatus 11 also has the connecting path 60 and the connecting switch 61. The connecting path 60 electrically connects the intermediate terminal B of the assembled battery 20 with the neutral point O. The connecting switch 61 is installed on the connecting path 60. In this embodiment, the connecting switch 61 is made of a relay. When the connecting switch 61 is turned on, it electrically connects between the intermediate terminal B and the neutral point O. Alternatively, when the connecting switch 61 is turned off, it blocks the electrical connection between the intermediate terminal B and the neutral point O.

The power conversion system 10 also includes the monitoring unit 50. The monitoring unit 50 measures a terminal voltage at each cell of the assembled battery 20 and a SOC and a temperature of each cell of the assembled battery 20 to monitor the state of each cell. The monitoring unit 50 outputs information (which will also be referred to as battery information) about the terminal voltage at and the SOC and temperature of each cell of the assembled battery 20 to the controller 70 of the inverter 30.

The power conversion system 10 also includes the current sensor 62 and the phase current sensor 63. The current sensor 62 measures the neutral point current IMr that is an electrical current flowing in the connecting path 60. The current sensor 62 outputs the measured value of the neutral point current IMr to the controller 70. The phase current sensor 63 measures at least two of three phase currents. For instance, the phase current sensor 63 works to measure electrical currents flowing through at least two of the phase conductors 33U, 33V, and 33W and outputs the measured values of the phase currents (which will also be referred to as measured currents Ir) to the controller 70.

The power conversion system also includes the atmospheric pressure sensor 51. The atmospheric pressure sensor 51 works to measure the atmospheric pressure around the rotating electrical machine 40. The atmospheric pressure sensor 51 outputs the measured value Pr of the atmospheric pressure to the controller 70.

The power conversion system 10 also includes the temperature sensor 52. The temperature sensor 52 measures the temperature of at least one of the windings 41U, 41V, and 41W or the ambient temperature around at least one of the phase windings 41U, 41V, and 41W. The temperature sensor 52 outputs the measured temperature Tr to the controller 70.

The controller 70 is made mainly of a microcomputer and works to execute a switch control task to turn on or off the switches QUH to QWL in order to feed a controlled variable of the rotating electrical machine 40 back to a command value for the rotating electrical machine 40. For example, the controlled variable is the degree of torque produced by the rotating electrical machine 40. The command value is the torque command value Trq* outputted from the primary controller 53. The upper arm switch and the lower arm switch for each phase are alternately turned on. The controller 70 executes programs stored in a memory installed therein to perform given control functions or tasks. The control tasks may be realized by an electronic circuit that is electronic hardware or a combination of hardware and software. The controller 70 will also be referred to merely a controller.

Next, partial discharge which will occur at the phase-windings 41U, 41V, and 41W when the switch control task is executed will be described below. In the following discussion, the U-phase, V-phase, and W-phase windings 41U, 41V, and 41W will generally be referred to as the phase windings 41a for the sake of simplicity of explanation. A selected one of the phase windings 41a will also be referred to as a first phase winding 41a. Each of the phase windings 41a is made of the conductor 41b and the insulating layer 41c wrapping the outer periphery of the conductor 41b. The insulating layer 41c is made from an electrically insulating material, such as synthetic resin. FIG. 2 is a cross sectional view of the insulating layers 41c of adjacent turns of the first phase winding 41a. A rise in winding voltage that is a potential difference between adjacent turns of the first phase winding 41a will cause the partial discharge to appear between the adjacent turns of the first phase winding 41a. When the winding voltage becomes higher than a PDIV (Partial Discharge Inception Voltage) at which the partial discharge starts to occur, it will result in an increased probability that the partial discharge will be developed.

The probability of the event of partial discharge usually increases with a decrease in the PDIV. The PDIV usually decreases with a decrease in density of air. The density of air usually decreases with a decrease in atmospheric pressure around the rotating electrical machine 40 or a rise in temperature of the first phase winding 41a. Specifically, the PDIV, as can be seen in FIG. 3, decreases with a decrease in the atmospheric pressure around the rotating electrical machine 40 or an increase in temperature of the phase winding 41a.

The probability of the event of partial discharge increases with a rise in the winding voltage. The degree of the partial discharge usually increases with an increase in difference between the winding voltage and the PDIV. The higher the terminal voltage at each of the storage batteries 21 and 22 which is delivered to the switching device 31, the higher the voltage output from the switching device 31 will be. In other words, the winding voltage, as can be seen in FIG. 4, becomes high with a rise in terminal voltage at each of the storage batteries 21 and 22. The surge voltage arising from turning off of the switches QUH to QWL will rise in increase in electrical current flowing through the first phase winding 41a. When the surge voltage is transmitted to the rotating electrical machine 40, it will result in an instantaneous rise in winding voltage appearing at the first phase winding 41a. The winding voltage, therefore, as illustrated in FIG. 4, rises with an increase in current flowing through the first phase winding 41a.

Figure 5:
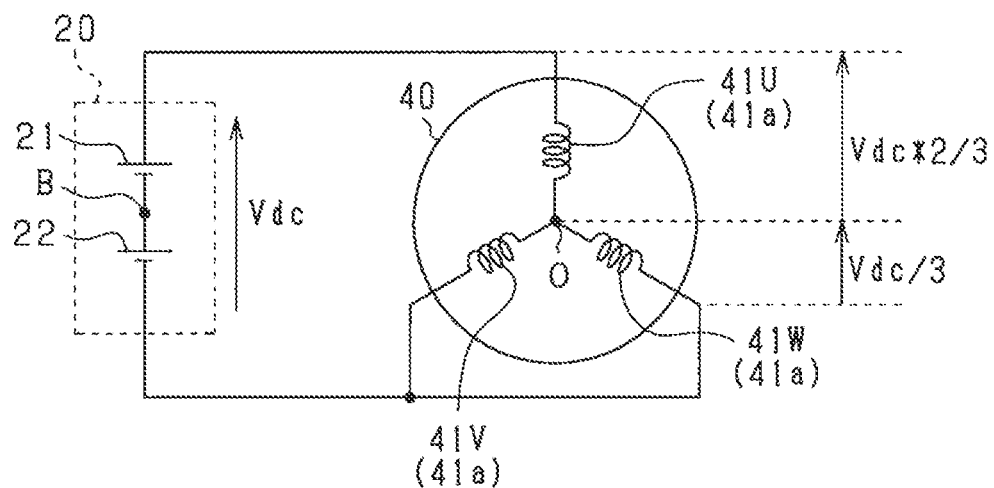
FIG. 5 is a view which shows a maximum value of a winding voltage when a connecting switch is turned off.

Next, the winding voltage developed at the first phase winding 41a during execution of the switch control task will be described below. The switch control task is usually executed when the connecting switch 61 is in the off-state. FIG. 5 is a view for explaining a maximum value Vm of the winding voltage developed at the first phase winding 41a when the connecting switch 61 is placed in the off-state. FIG. 5 omits the switches QUH, QVH, QWH, QUL, QVL, and QWL, the connecting path 60, and the connecting switch 61 for the brevity of illustration. The same reference numbers used in FIG. 5 refer to the same parts in FIG. 1 for the sake of convenience.

In the illustrated three-phase winding, when the switch control task is executed, it will cause one of the phase windings 41a of the U-phase, the V-phase and the W-phase (which will also be referred to as the first phase winding 41a) to be connected to one of the positive terminal of the first storage battery 21 and the negative terminal of the second storage battery 22, while the phase windings 41a of the other two of the U-phase, the V-phase, and the W-phase (which will also be referred to as the second and third phase windings 41a) are connected to the other of the positive terminal of the first storage battery 21 and the negative terminal of the second storage battery 22. In the example in FIG. 5, the first phase winding 41a is connected to the positive terminal of the first storage battery 21, while the second and third phase windings 41a are connected to the negative terminal of the second storage battery 22. The maximum value Vm of the winding voltage developed at the first phase winding 41a will be a fraction (i.e., 2/3×Vdc) of the terminal voltage at the assembled battery 20 where Vdc is the power supply voltage, that is, the terminal voltage at the assembled battery 20. The maximum value Vm of the winding voltage at the first phase winding 41a is higher than a maximum value (i.e., 1/3×Vdc) of the winding voltage appearing at the second and third phase windings 41a, thereby resulting in an increased risk that partial discharge may occur at the first phase winding 41a, which leads to an increased degree of the partial discharge.

There is a probability that an increase in degree of the partial discharge at the phase winding 41a above a permissible value thereof may result in deterioration of the insulating layer 41c of the phase winding 41a. In order to alleviate such a problem, it is possible to increase an insulating distance between the phase winding 41a and an adjacent conductive member. This, however, results in an increased total size of the rotating electrical machine 40.

Figure 6:
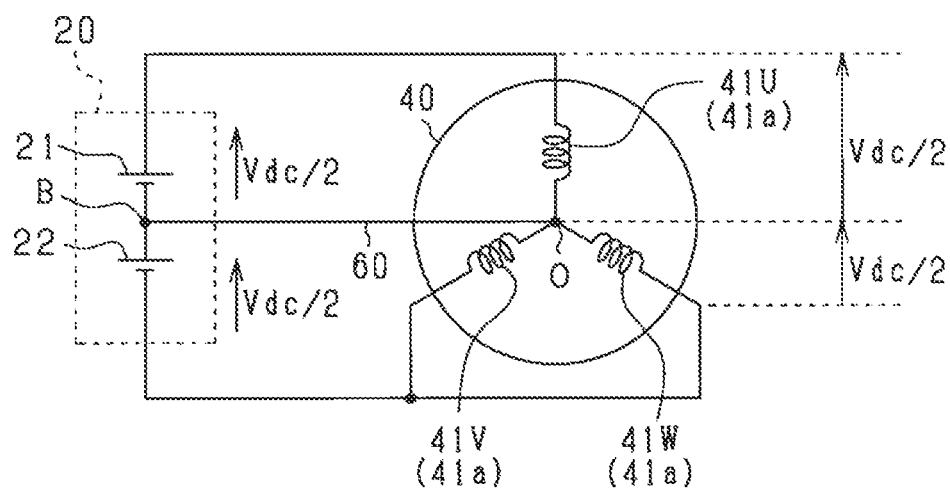

In order to eliminate the above risk in this embodiment, required insulating properties of the phase windings 41a are ensured by controlling the operation of the connecting switch 61. Specifically, the switch control task is executed when the connecting switch 61 is placed in the on-state. FIG. 6 is a view for explaining the winding voltage developed at the phase winding 41a when the connecting switch 61 is in the on-state. FIG. 6 omits the switches QUH, QVH, QWH, QUL, QVL, and QWL and the connecting switch 61 for the brevity of illustration. The same reference numbers used in FIG. 6 refer to the same parts in FIG. 1 for the sake of convenience.

When the connecting switch 61 is in the on-state, the neutral point O and the intermediate terminal B of the assembled battery 20 are electrically connected together. The execution of the switch control task, therefore, causes the first phase winding 41a to be connected at a first end thereof to the positive terminal of the first storage battery 21 or the negative terminal of the second storage battery 22 and at a second end thereof to the intermediate terminal B. The winding voltage at the first phase winding 41a will, therefore, be the terminal voltage at the first storage battery 21 or the second storage battery 22.

FIG. 6 demonstrates for the case where the terminal voltage at each of the first storage battery 21 and the second storage battery 22 is 1/2×Vdc. The maximum value Vm of the winding voltage when the connecting switch 61 is turned off is 2/3×Vdc, while the maximum value Vm of the winding voltage when the connecting switch 61 is turned on is decreased to be 1/2×Vdc.

The levels of terminal voltage (e.g., voltage rating) at the first storage battery 21 and the second storage battery 22 are preferably set equal to each other, but however, may alternatively be different from each other.

The controller 70 uses the value of the atmospheric pressure measured by the atmospheric pressure sensor 51 (which will also be referred to below as the atmospheric pressure value Pr), the measured temperature Tr measured by the temperature sensor 52, the measured currents Ir measured by the phase current sensor 63, and the terminal voltage Vr at the assembled battery 20 to determine whether the degree of partial discharge occurring at the phase winding 41a is higher than a given permissible value. In this embodiment, the determination of whether the degree of partial discharge developed at the phase winding 41a is higher than permissible value involves a determination of whether the partial discharge is occurring at the phase winding 41a. Specifically, when determining that at least one of first to fourth conditions, as discussed below, is met, the controller 70 concludes that partial discharge is occurring at the phase winding 41a.

The first condition is a condition where the atmospheric pressure value Pr measured by the atmospheric pressure sensor 51 is lower than or equal to a given atmospheric pressure reference value Pth.

The second condition is a condition where the temperature Tr measured by the temperature sensor 52 is higher than or equal to the temperature reference value Tth.

The third condition is a condition where absolute values of the currents Ir measured by the phase current sensor 63 are higher than or equal to the current reference value Ith. The currents Ir measured by the phase current sensor 63 will also be referred to as current parameters.

The fourth condition is a condition where terminal voltage Vr at the assembled battery 20 is higher than or equal to the voltage reference value Vdcth. The terminal voltage Vr at the assembled battery 20 may be derived using the battery information obtained by the monitoring unit 50. The terminal voltage Vr at the assembled battery 20 obtained from the monitoring unit 50 will be referred to as a voltage parameter.

When having determined that the partial discharge occurs, the controller 70 turns on the connecting switch 61. The controller 70 will also be referred to as a determiner.

Figure 7:
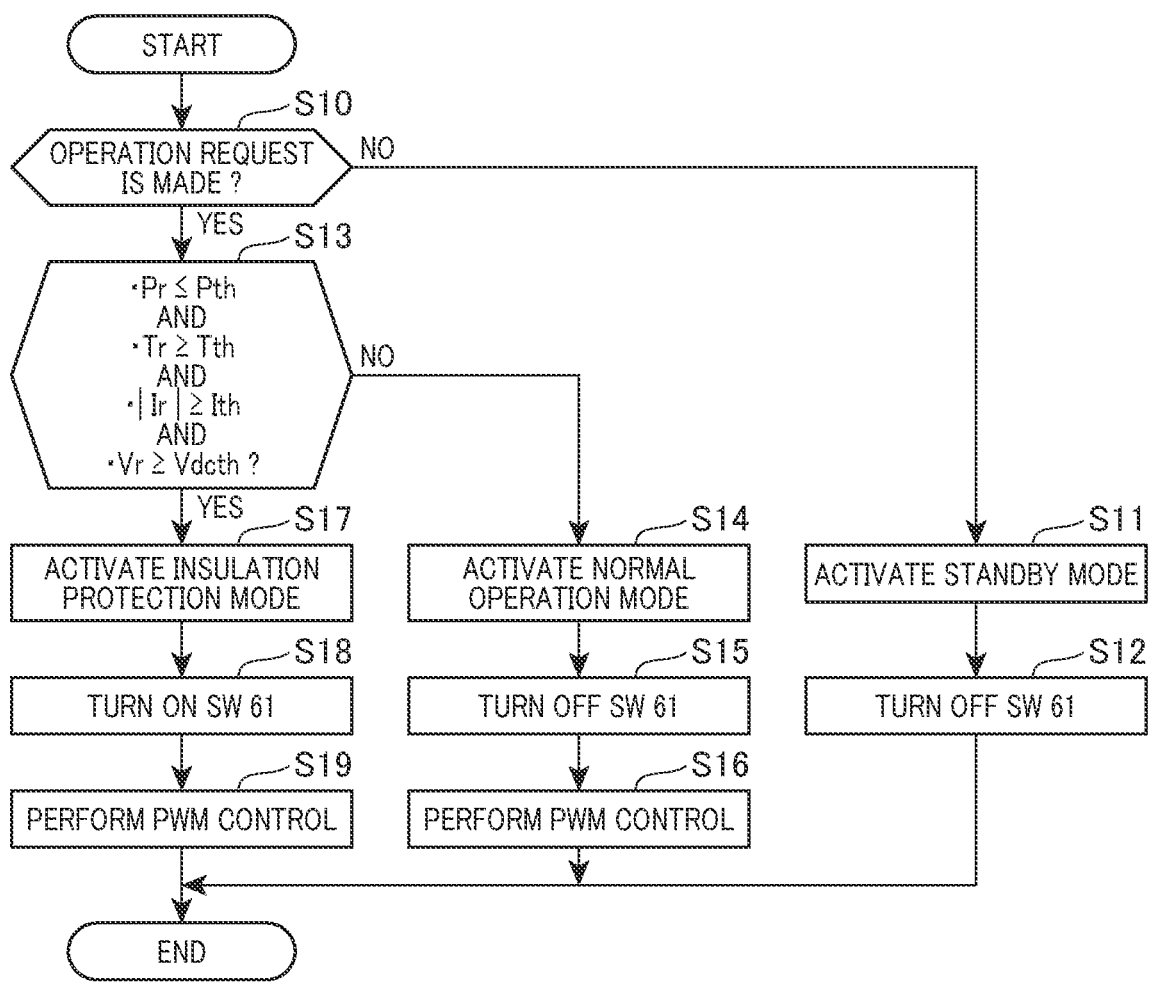
FIG. 7 is a flowchart of a sequence of logical steps of a switch control task.

FIG. 7 shows a sequence of steps or a control program which is executed by the controller 70 at a given control cycle.

After entering the program, the routine proceeds to step S10 wherein it is determined whether there is a request to operate the rotating electrical machine 40. In this embodiment, such a request includes a request to move the vehicle using toque produced by the rotating electrical machine 40. If a NO answer is obtained in step S10, the routine proceeds to step S11.

In step S11, a standby mode is entered to turn off the switches QUH to QWL of the switching device 31. The routine proceeds to step S12 wherein the connecting switch 61 is turned off to block the electrical connection between the intermediate terminal B and the neutral point O.

If a YES answer is obtained in step S10, then the routine proceeds to step S13 wherein it is determined whether the partial discharge occurs at the phase winding 41a. Specifically, the controller 70 derives the atmospheric pressure value Pr, the measured temperature Tr, the measured currents Ir, and the terminal voltage Vr. The controller 70 then determines whether at least one of the above first to fourth conditions is met. If a NO answer is obtained in step S13, then the routine proceeds to step S14. The operation in step S13 corresponds to an atmospheric pressure information obtainer, a temperature obtainer, a current obtainer, and a voltage obtainer.

In step S14, a normal operation mode is entered to execute the switch control task. The routine proceeds to step S15 wherein the connecting switch 61 is turned off to block the electrical connection between the intermediate terminal B and the neutral point O. The routine proceeds to step S16 wherein the upper and lower arm switches QUH to QWL are turned on or off with the connecting switch 61 kept off. Specifically, switch control signals for the upper and lower switches QUH to QWL are produced in the form of duty cycle signals by PWM (Pulse-width modulation) using comparison in level between signals into which command voltages for the U-, V-, and W-phases are standardized by the power source voltage Vdc and a carrier signal, such as a triangular wave signal.

Alternatively, if a YES answer is obtained in step S13, then the routine proceeds to step S17 wherein an electrical insulation protection mode is entered in which the electrical insulation of the phase windings 41a is ensured, and the switch control task is executed. The routine proceeds to step S18 wherein the connecting switch 61 is turned on to achieve the electrical connection between the intermediate terminal B and the neutral point O. The routine then proceeds to step S19 wherein the upper and lower arm switches QUH to QWL are turned on or off in the PWM control mode in the same way as step S16 with the connecting switch 61 kept on.

Figure 8:
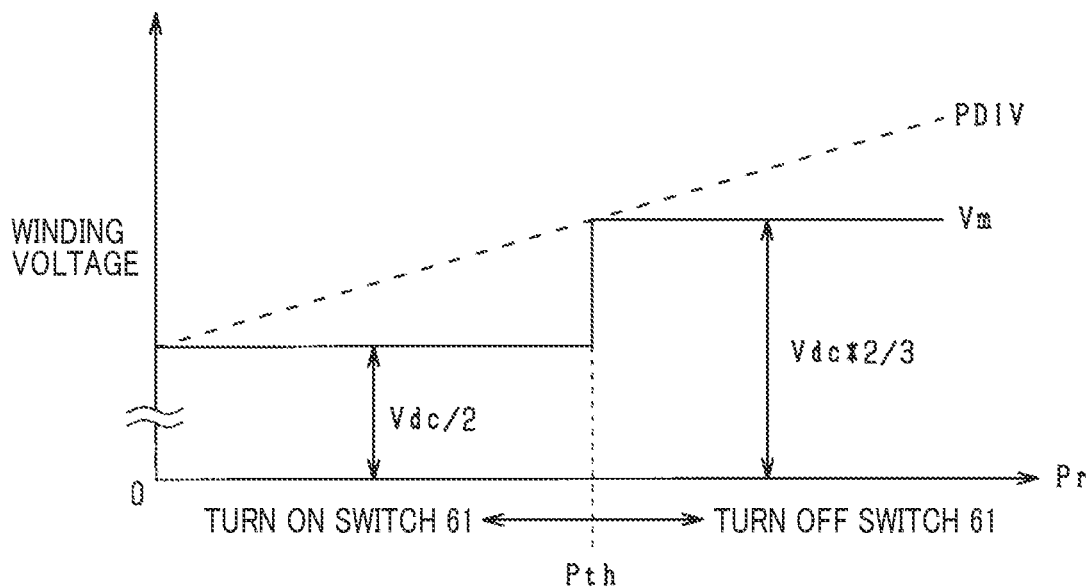
FIG. 8 is a view which represents an example of a switching control task.

FIG. 8 demonstrates an example where the switch control task to control the operation of the connecting switch 61 as a function of the atmospheric pressure value Pr derived by the atmospheric pressure sensor 51. FIG. 8 represents a relation between the maximum value Vm of the winding voltage at the phase windings 41a and the PDIV of the partial discharge in relation to the atmospheric pressure value Pr. In FIG. 8, a solid line indicates the maximum value Vm of the winding voltage. A broken line indicates the PDIV of the partial discharge. FIG. 8 shows that when the maximum value Vm of the winding voltage is lower than the PDIV of the partial discharge, there is no risk or a very low risk that the partial discharge may occur, and that when the maximum value Vm of the winding voltage is higher than or equal to the PDIV of the partial discharge, there is a high or extremely high risk that the partial discharge may occur.

In a range where the atmospheric pressure value Pr is higher than the atmospheric pressure reference value Pth, the connecting switch 61 is turned off, so that the PDIV will become higher than $2/3 \times Vdc$ that is the maximum value Vm of the winding voltage when the connecting switch 61 is in the off-state. In such a condition, there is no or low risk that the partial discharge may occur in execution of the switch control task. In the example of FIG. 8, the atmospheric pressure reference value Pth represents the atmospheric pressure value Pr around the rotating electrical machine 40 when the PDIV is equal to $2/3 \times Vdc$.

Alternatively, in a range where the atmospheric pressure value Pr is lower than or equal to the atmospheric pressure reference value Pth, the PDIV will be lower than $2/3 \times Vdc$ that is the maximum value Vm of the winding voltage when the connecting switch 61 is in the off-state. This leads to a risk that the partial discharge may occur in the phase winding 41a when the connecting switch 61 is in the off-state. In order to alleviate such a drawback, the controller 70 determines the first condition as being met and turns on the connecting switch 61 in the range where the atmospheric pressure value Pr is lower than or equal to the atmospheric pressure reference value Pth. This causes the maximum value Vm of the winding voltage developed at the phase winding 41a in the execution of the switch control task to be decreased to $1/2 \times Vdc$ that is lower than the PDIV, thereby minimizing the risk that the partial discharge may be created at the phase winding 41a in the execution of the switch control task in the range where the atmospheric pressure value Pr is lower than or equal to the atmospheric pressure reference value Pth.

The control of operation of the connecting switch 61 as a function of the temperature Tr measured by the temperature sensor 52 is made in the same way as that in which the connecting switch 61 is controlled in operation using the atmospheric pressure Pr measured by the atmospheric pressure sensor 51. Specifically, in a range where the measured temperature Tr is lower than the temperature reference value Tth, the PDIV is higher than $2/3 \times Vdc$ that is the maximum value Vm of the winding voltage, thereby resulting in no risk that the partial discharge may occur in execution of the switch control task in the condition where the connecting switch 61 is in the off-state. Alternatively, in a range where the measured temperature Tr is higher than or equal to the temperature reference value Tth, the PDIV is lower than or equal to $2/3 \times Vdc$ that is the maximum value Vm of the winding voltage. The controller 70, therefore, determines that the second condition is met in the range where the measured temperature Tr is higher than or equal to the temperature reference value Tth and then turns on the connecting switch 61. The controller 70 then executes the switch control task in the condition where the connecting switch 61 is kept on, thereby minimizing the risk of occurrence of the partial discharge.

When absolute values of the measured currents Ir measured by the phase current sensor 63 are lower than the current reference value Ith, the controller 70 turns off the connecting switch 61 and executes the switch control task. Alternatively, when the absolute values of the measured currents Ir measured by the phase current sensor 63 are higher than or equal to the current reference value Ith, the controller 70 determines that the third condition is met and then turns on the connecting switch 61. The controller 70 executes the switch control task with connecting switch 61 kept on.

When the terminal voltage Vr appearing at the assembled battery 20 is lower than the voltage reference value Vdcth, the controller 70 turns off the connecting switch 61 and executes the switch control task. Alternatively, when the terminal voltage Vr at the assembled battery 20 is higher than or equal to the voltage reference value Vdcth, the controller 70 determines that the fourth condition is met and turns on the connecting switch 61. The controller 70 executes the switch control task with the connecting switch 61 kept on.

For instance, the controller 70 determines the reference values Pth, Tth, Ith, and Vdcth as a function of the atmospheric pressure value Pr, the measured temperature Tr, the measured currents Ir, and the terminal voltage Vr at the assembled battery 20.

Specifically, the controller 70 determines the atmospheric pressure reference value Pth using a predefined relation (expressed by, for example, mapped data or algorithm) between at least one of the measured temperature Tr, the measured currents Ir, and the terminal voltage Vr at the assembled battery 20 and the atmospheric pressure reference value Pth at which the degree of partial discharge will be lower than a permissible level. The controller 70 also determines the temperature reference value Tth using a predefined relation (expressed by, for example, mapped data or algorithm) between at least one of the atmospheric pressure value Pr, the measured currents Ir, and the terminal voltage Vr at the assembled battery 20 and the temperature reference value Tth at which the degree of partial discharge will be lower than the permissible level.

Further, the controller 70 determines the current reference value Ith using a predefined relation (expressed by, for example, mapped data or algorithm) between at least one of the atmospheric pressure value Pr, the measured temperature Tr, and the terminal voltage Vr at the assembled battery 20 and the current reference value Ith at which the degree of partial discharge will be lower than the permissible level. The controller 70 also determines the voltage reference value Vdcth using a predefined relation (expressed by, for example, mapped data or algorithm) between at least one of the atmospheric pressure value Pr, the measured temperature Tr, and the measured currents Ir and the voltage reference value Vdcth at which the degree of partial discharge will be lower than the permissible level. When it is required to completely eliminate the risk of partial discharge, the permissible level is preferably set to zero. Alternatively, when the partial discharge is slightly permitted, the permissible level may be selected to be greater than zero.

The above-described embodiment offers the following beneficial advantages.

The power conversion apparatus 11 is, as already described, equipped with the connecting path 60, the connecting switch 61, and the controller 70. The connecting path 60 electrically connects the negative terminal of the first storage battery 21, the positive terminal of the second storage battery 22, and the neutral point O together. The connecting switch 61 is installed in the connecting path 60. The controller 70 is designed to determine whether at least one of the above described first to fourth conditions is met. When it is determined that at least one of the first to fourth conditions has been satisfied, the controller 70 concludes that there is the risk of occurrence of the partial discharge and then turns on the connecting switch 61.

In the above structure, when the connecting switch 61 is kept off in execution of the switch control task, a fraction of the terminal voltage appearing at the assembled battery 20 is applied to the phase winding 41a. The maximum value Vm of the winding voltage becomes 2/3×Vdc. Alternatively, when the connecting switch 61 is in the on-state, voltage equivalent to the terminal voltage at the first storage battery 21 of the second storage battery 22 is applied to the phase winding 41a. In a case where the level of terminal voltage developed at the first storage battery 21 is identical with that at the second storage battery 22, the maximum value Vm of the winding voltage will be 1/2×Vdc. The execution of the switch control task when the connecting switch 61 is in the on-state, therefore, results in the maximum value Vm of the winding voltage at the phase winding 41a being lower than that in execution of the switch control task when the connecting switch 61 is in the off-state. This enables the switching device 31 and the rotating electrical machine 40 to be used to reduce the risk of the partial discharge, thereby permitting an insulating distance between the phase windings 41a. This enables the total size of the rotating electrical machine 40 to be reduced.

Unlike this embodiment, the risk of the partial discharge may be reduced by stepping down the terminal voltage at the assembled battery 20 and applying it to the switching device 31 to decrease the level of the winding voltage. This, however, may result in a decrease in output power produced by the rotating electrical machine 40 in execution of the switch control task. In contrast, this embodiment is designed to execute the switch control task when the connecting switch 61 is in the on-state, thereby resulting in a decrease in maximum value Vm of the winding voltage, which will eliminate a risk of reduction in output power produced by the rotating electrical machine 40 in execution of the switch control task.

The controller 70 obtains the atmospheric pressure value Pr measured by the atmospheric pressure sensor 51. Usually, the lower the atmospheric pressure around the rotating electrical machine 40, the lower the partial discharge inception voltage (PDIV) will be, thereby facilitating the occurrence of the partial discharge. It is, therefore, possible to adequately determine whether a condition where the connecting switch 61 should be turned on has been met based on the measured atmospheric pressure value Pr.

The controller 70 obtains the temperature Tr measured by the temperature sensor 52. Usually, the higher the temperature of the phase winding 41a, the lower the PDIV will be, thereby facilitating the occurrence of the partial discharge. It is, therefore, possible to adequately determine whether the condition where the connecting switch 61 should be turned on has been met based on the temperature Tr measured by the temperature sensor 52.

The controller 70 obtains the currents Ir measured by the phase current sensor 63. The higher the electrical current flowing through the phase winding 41a, the higher the surge voltage arising from turning off of the switches QUH to QWL, thereby resulting in an increase in maximum value Vm of the winding voltage, which facilitates the occurrence of partial discharge. It is, therefore, possible to adequately determine whether the condition where the connecting switch 61 should be turned on has been met based on the currents Ir measured by the phase current sensor 63.

The controller 70 obtains the terminal voltage Vr developed at the assembled battery 20 from the monitoring unit 50. Usually, the higher the terminal voltage Vr at the assembled battery 20, the higher the voltage outputted from the switching device 31 will be, thereby resulting in an increase in maximum value Vm of the winding voltage, which facilitates the occurrence of partial discharge. It is, therefore, possible to adequately determine whether the condition where the connecting switch 61 should be turned on has been met based on the terminal voltage Vr appearing at the assembled battery 20 which is derived by the monitoring unit 50.

Modifications of the First Embodiment

The power conversion system 10 may include an altitude sensor instead of the atmospheric pressure sensor 51. The altitude sensor measures the altitude of the rotating electrical machine 40 and outputs it to the controller 70. The controller 70 calculates the atmospheric pressure value Pr around the rotating electrical machine 40 as a function of the measured altitude.

In place of determination of whether the third condition where the currents Ir measured by the phase current sensor 63 are higher than the current reference value Ith has been met, the controller 70 may determine whether the torque command value Trq*, as outputted from the primary controller 53, is higher than a torque reference value Trqth. Specifically, the controller 70 may obtain the torque command value Trq* and determine whether the third condition has been met when the torque command value Trq* is higher than the torque reference value Trqth.

Usually, the higher the torque command value Trq*, the higher the electrical current flowing through the phase winding 41a will be. This results in an increase in surge voltage developed by turning off of the switches QUH to QWL, so that the winding voltage will rise, thereby facilitating occurrence of the partial discharge. It is, therefore, possible to adequately determine whether the condition where the connecting switch 61 should be turned on has been met using the derived torque command value Trq*.

The determination of whether the third condition has been met may alternatively be made by determining whether the magnitude of a command current vector defined by d-axis and q-axis command currents (i.e., target currents) is higher than a given value instead of use of the torque command value Trq*. Specifically, the controller 70 calculates the command current vector and concludes that the third condition has been met when the magnitude of the command current vector is greater than a given value. The torque command value Trq* or the magnitude of the command current vector will also be referred to as a current parameter.

Usually, the recovery surge voltage arising from turning on of the switches QUH to QWL increases with a decrease in current flowing through the phase winding 41a. This results in a risk that the winding voltage at the phase winding 41a may instantaneously rise.

The controller 70 may determine that the third condition has been met when absolute values of the currents Ir measured by the phase current sensor 63 are lower than or equal to a low current reference value instead of determination of whether absolute values of the currents Ir measured by the phase current sensor 63 are higher than or equal to the current reference value Ith.

The controller 70 may determine that the fourth condition has been met when a SOC (State Of Charge) of the assembled battery 20 is higher than a permissible reference SOCth instead of determination of whether the terminal voltage Vr at the assembled battery 20 is higher than the voltage reference value Vdcth. The SOC derived by the monitoring unit 50 will also be referred to as a voltage parameter.

Usually, the higher the SOC of the assembled battery 20, the higher the terminal voltage developed at the assembled battery 20 will be. The rise in level of voltage output from the switching device 31, therefore, results in an increase in the maximum value Vm of the winding voltage, thereby increasing the risk of the partial discharge. It is, therefore, possible to adequately determine whether the condition where the connecting switch 61 should be turned on has been met based on the SOC of the assembled battery 20.

Figure 9:
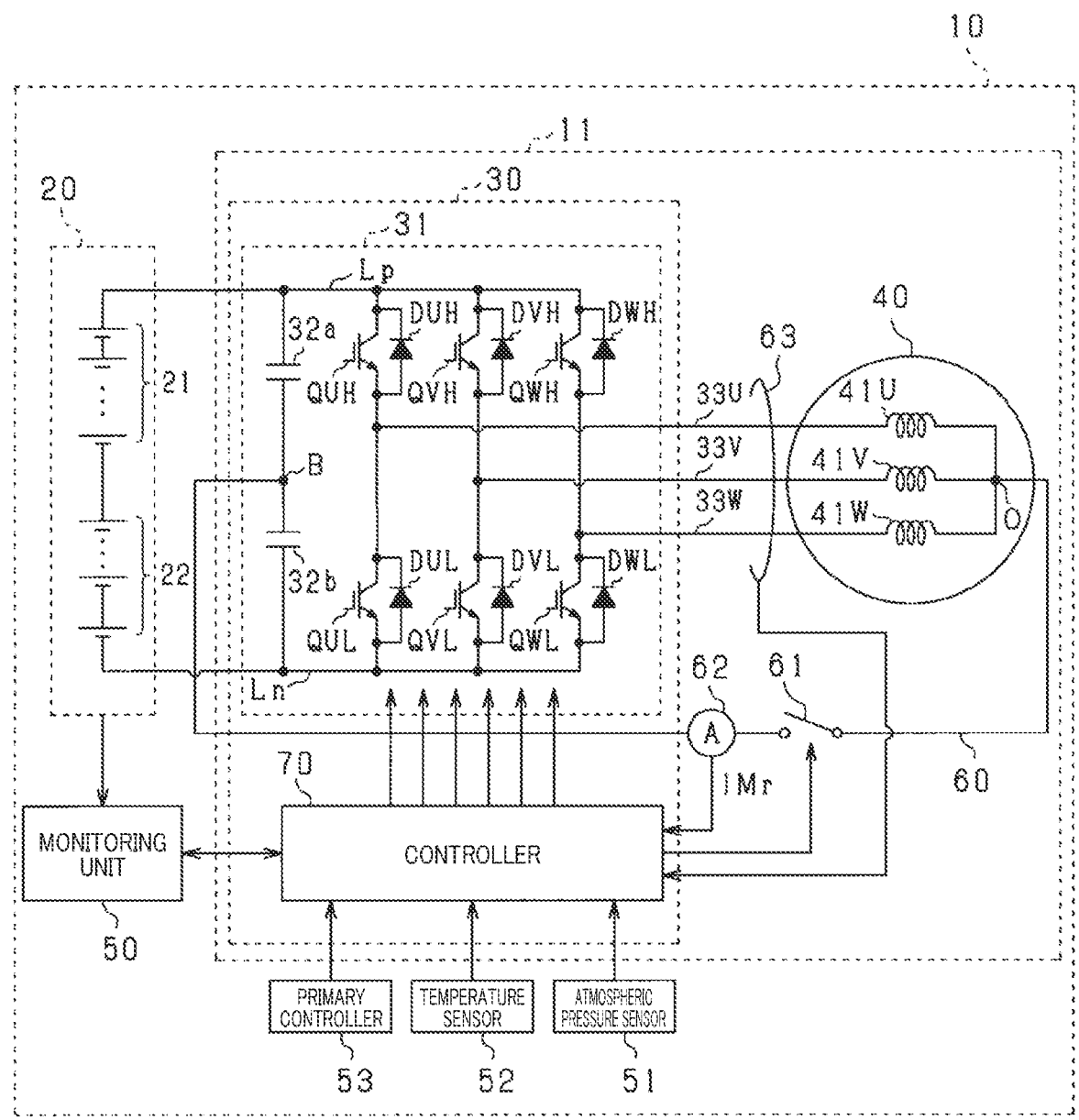
FIG. 9 is a structural view of a power conversion system which is a modification of the first embodiment.

The location of the intermediate terminal B may be changed. The power conversion apparatus 11 is, as can be seen in FIG. 9, equipped with the first capacitor 32a and the second capacitor 32b which are identical in capacitance with each other. In FIG. 9, the same reference numbers as those in FIG. 1 refer to the same parts for the sake of convenience. The first capacitor 32a and the second capacitor 32b may alternatively be different in capacitance from each other.

The first capacitor 32a is connected at the first end thereof to the positive-side bus bar Lp. The second capacitor 32b is connected at the first end thereof to the negative-side bus bar Ln. The intermediate terminal B is connected to the second ends of the first capacitor 32a and the second capacitor 32b. The first capacitor 32a will also be referred to as a first electrical storage. The second capacitor 32b will also be referred to as a second electrical storage.

Figure 10:
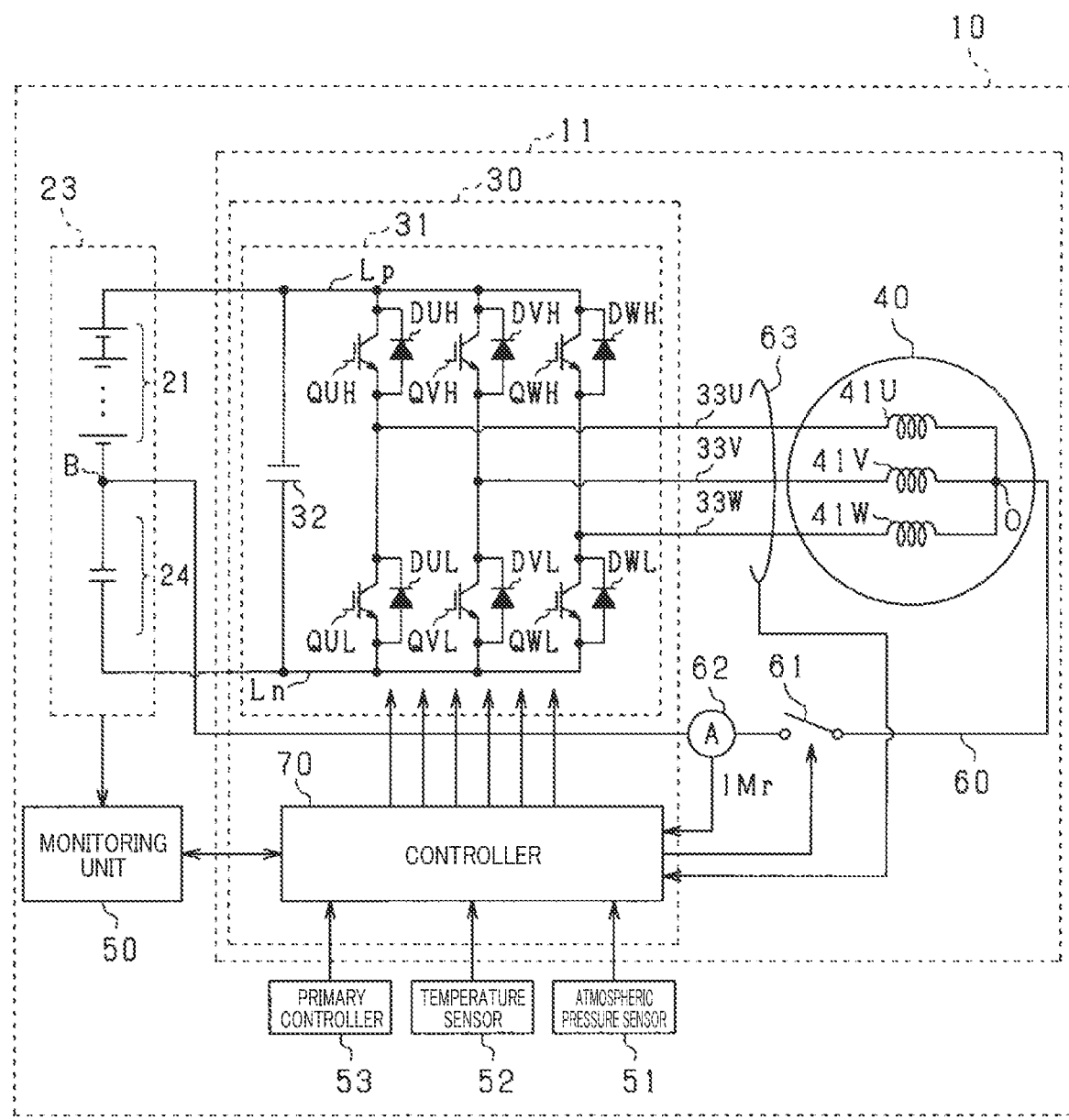
FIG. 10 is a structural view which shows a power conversion system in a modified form of the first embodiment.

The power conversion system 10 in the first embodiment may be equipped with electrical storages which are different in type from each other and connected in series with each other instead of the assembled battery 20. The power conversion system 10 may be, as illustrated in FIG. 10, equipped with the power supply 23. In FIG. 10, the same reference numbers as those in FIG. 1 refer to the same parts for the sake of convenience.

The power supply 23 includes the first storage battery 21 and the capacitor 24 instead of the second storage battery 22. The storage battery 21 is connected at a positive terminal thereof to the positive-side bus bar Lp. The capacitor 24 is connected at a negative terminal thereof to the negative-side bus bar Ln. The intermediate terminal B is connected to the negative terminal of the storage battery 21 and the positive terminal of the capacitor 24. The power supply 23 may alternatively be designed to have the second storage battery 22 and the capacitor 24 instead of the first storage battery 21. The capacitor 24 is preferably made of a supercapacitor having a higher capacitance. In this embodiment, the capacitor 24 serves as a second electrical storage.

Second Embodiment

The second embodiment will be described below with reference to the drawings in terms of differences between itself and the first embodiment. The controller 70 in the second embodiment functions to perform an energy management task to transfer or exchange electrical energy between the first storage battery 21 and the second storage battery 22.

The energy management task executed in a condition where the connecting switch 61 is kept on will be discussed below.

Figure 11A:
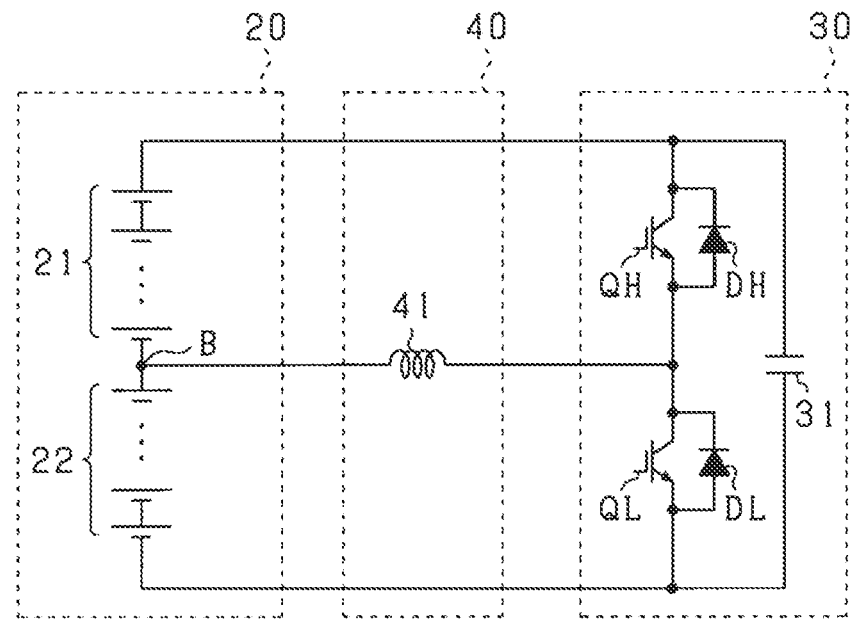
FIG. 11($a$) is a circuit diagram which demonstrates an equivalent circuit in the second embodiment.

FIG. 11(a) illustrates an equivalent circuit of the power conversion system 10 used in the energy management task. In FIG. 11(a), each of the phase windings 41U to 41W is generally denoted as the winding 41. Each of the upper arm switches QUH, QVH, and QWH is generally denoted as the upper arm switch QH. Similarly, each of the upper arm diodes DUH, DVH, and DWH is generally denoted as the upper arm diode DH. Each of the lower arm switches QUL, QVL, and QWL is generally denoted as the lower arm switch QL. Each of the lower arm didoes DUL, DVL, and DWL is generally denoted as the lower arm diode DL.

Figure 11B:
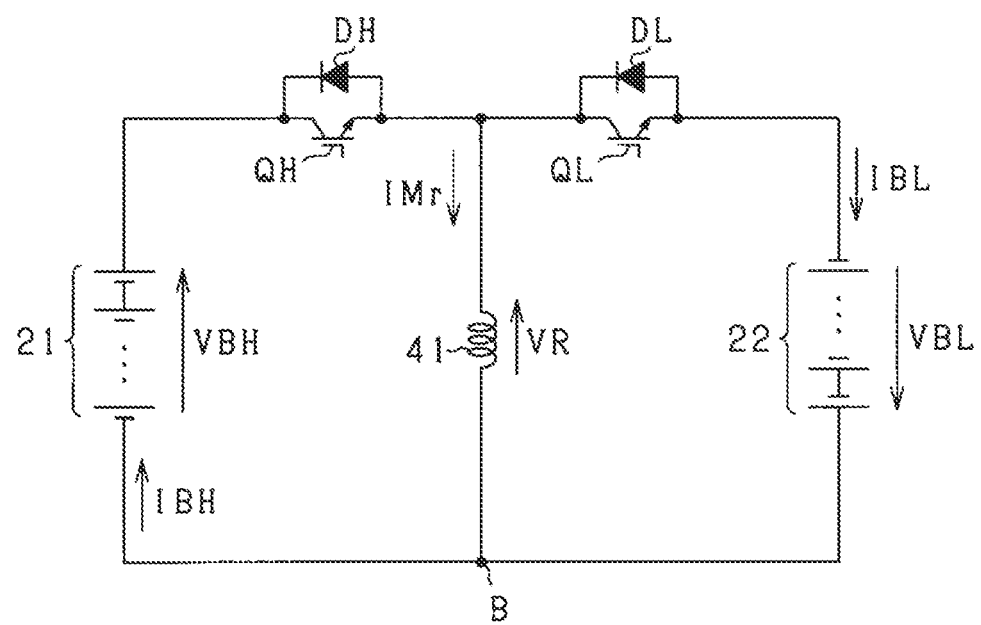

The equivalent circuit in FIG. 11(a) may also be expressed by that in FIG. 11(b). The equivalent circuit in FIG. 11(b) is designed as a buck-boost chopper also called a step-up and -down chopper circuit which is capable of bidirectionally transmitting electrical power from the first storage battery 21 to the second storage battery 22 and vice versa. In FIG. 11(b), IBH indicates a flow of electrical current inputted into the first storage battery 21, while IBL indicates a flow of electrical current inputted into the second storage battery 22. When charging currents flow into the first and second storage batteries 21 and 22, the currents IBH and IBL will be negative. Alternatively, when discharging currents flow from the first and second storage batteries 21 and 22, the currents IBH and IBL will be positive. In FIG. 11(b), VR indicates the terminal voltage developed at the winding 41. IMr indicates the neutral point current. When it comes to a positive or negative in sign of the neutral point current IMr, the neutral point current IMr flowing from the winding 41 toward the intermediate terminal B is defined as being positive (i.e., in a positive direction), while the neutral point current IMr flowing in the opposite direction is defined as being negative (i.e., in a negative direction).

Referring to FIG. 11(b), when the upper arm switch QH is turned on, the terminal voltage Vr at the winding 41 will be at a positive level VBH, while when the lower arm switch QL is turned on, the terminal voltage Vr at the winding 41 will be at a negative level-VBL. In other words, when the upper arm switch QH is turned on, it causes an exciting current to flow through the winding 41 in the positive direction, while when the lower arm switch QL is turned on, it causes an exciting current to flow through the winding 41 in the negative direction.

Figure 12:
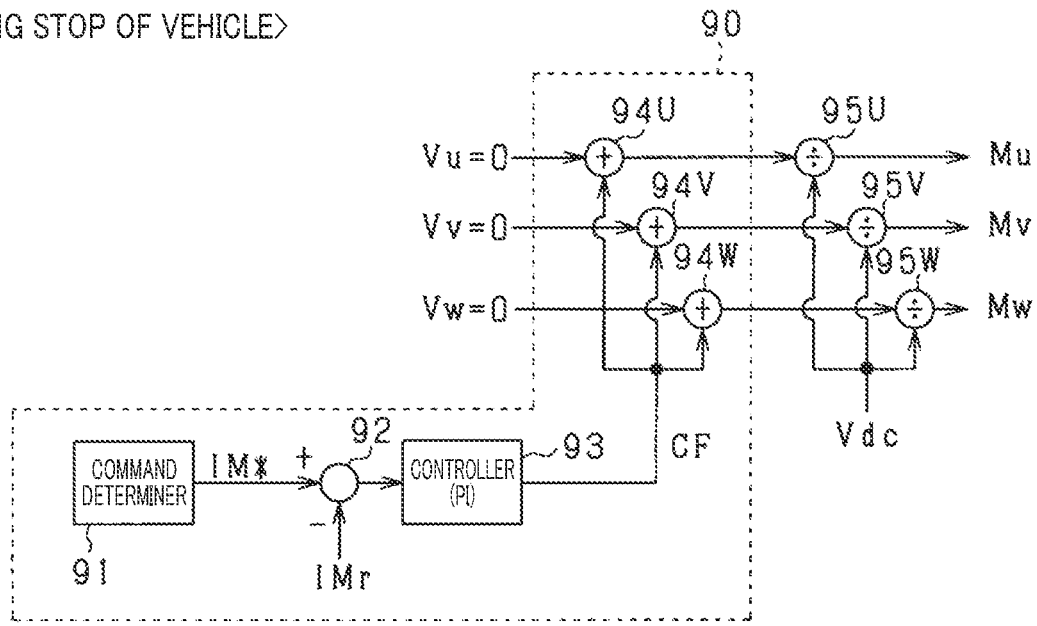
FIG. 12 is a block diagram which illustrates a functional structure of a controller when a vehicle is at rest.

FIG. 12 is a block diagram which represents the energy management task. Specifically, FIG. 12 illustrates control circuit blocks to execute the energy management task when the vehicle is at rest before the rotating electrical machine 40 is started.

The controller 70 is equipped with the energy controller 90. The energy controller 90 includes the command determiner 91, the neutral point deviation calculator 92, the neutral point controller 93, the U-phase superimposing unit 94U, the V-phase superimposing unit 94V, and the W-phase superimposing unit 94W.

Figure 13:
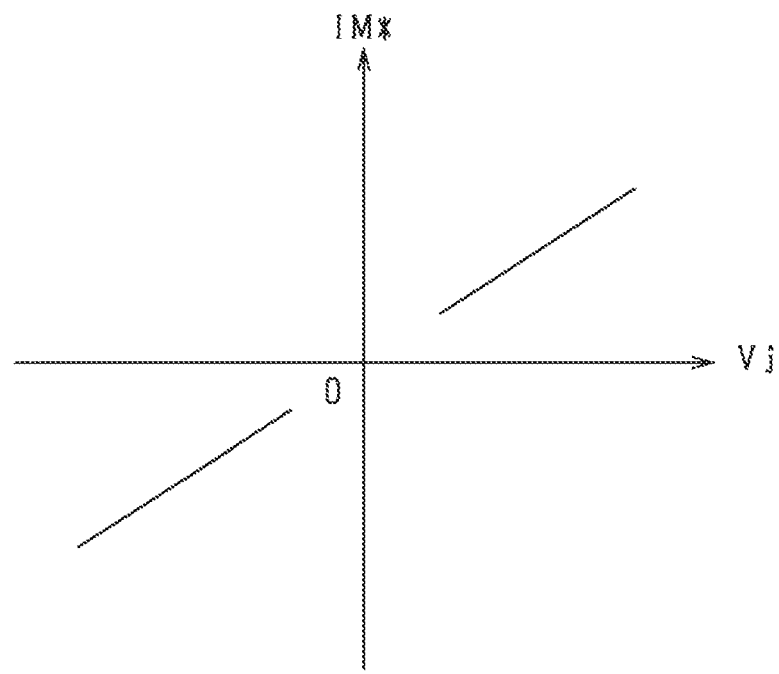
FIG. 13 is a view which represents how to determine a command neutral point current.

The command determiner 91 works to calculate the command neutral point current IM*. Specifically, the command determiner 91 subtract the terminal voltage VBL at the second storage battery 22 from the terminal voltage VBH at the first storage battery 21 to derive the reference voltage Vj (=VBH-VBL). When the reference voltage Vj is a positive value, the command determiner 91 selects the command neutral point current IM* to be positive. Specifically, the command controller 91, as illustrated in FIG. 13, determines the command neutral point current IM* to increase with an increase in level of the reference voltage Vj. When the calculated level of the reference voltage Vj is negative, the command determiner 91 sets the command neutral point current IM* to a negative value. More specifically, the command controller 91 determines an absolute value of the command neutral point current IM* to increase with an increase in absolute value of the reference voltage Vj. To this end, this embodiment executes the energy management task in order to average the level of terminal voltage at each of the first storage battery 21 and the second storage battery 22.

The neutral point deviation calculator 92 subtracts the neutral point current IMr that is an electrical current measured by the current sensor 62 from the command neutral point current IM* to derive the neutral point current deviation ΔIM. In this embodiment, the command neutral point current IM* is in the form of a direct current.

The neutral point controller 93 calculates an offset correction value CF that is a controlled variable needed to bring the calculated neutral point current deviation ΔIM to zero in a feedback mode. This embodiment uses a proportional-integral control mode as the feedback mode. A proportional-integral-derivative control mode may alternatively be used as the feedback mode.

The U-phase superimposing unit 94U adds the offset correction value CF to the U-phase command voltage Vu to derive a target U-phase command voltage Vu+CF. The V-phase superimposing unit 94V adds the offset correction value CF to the V-phase command voltage Vv to derive a target V-phase command voltage Vv+CF. The W-phase superimposing unit 94W adds the offset correction value CF to the W-phase command voltage Vw to derive a target W-phase command voltage Vw+CF. In the example of FIG. 12, the energy management task is executed when the vehicle is at rest, so that the U-phase command voltage Vu, the V-phase command voltage Vv, and the W-phase command voltage Vw are set to zero. Each of the target U-phase command voltage Vu+CF, the target V-phase command voltage Vv+CF, and the target W-phase command voltage Vw+CF are, therefore, given only by the offset correction value CF.

The controller 70 is equipped with the U-phase modulator 95U, the V-phase modulator 95V, and the W-phase modulator 95W. The U-phase modulator 95U works to divide the target U-phase command voltage Vu+CF by the power source voltage Vdc to derive a U-phase modulation factor Mu. The power source voltage Vdc, as referred to herein, is the sum of the terminal voltage VBH at the first storage battery 21 and the terminal voltage VBL at the second storage battery 22 which are derived by the monitoring unit 50. The V-phase modulator 95V works to divide the target V-phase command voltage Vv+CF by the power source voltage Vdc to derive a V-phase modulation factor Mv. Similarly, the W-phase modulator 95W works to divide the target W-phase command voltage Vw+CF by the power source voltage Vdc to derive a W-phase modulation factor Mw.

The controller 70 uses the U-phase, V-phase, and W-phase modulation factors Mu, Mv, and Mw to control switching operations of the three-phase switches QUH to QWL. Specifically, the controller 70 executes the switching control task in a PWM control mode as a function of a comparison of each of the U-phase, V-phase, and W-phase modulation factors Mu, Mv, and Mw with a carrier signal (e.g., a triangular wave signal).

Figure 14:
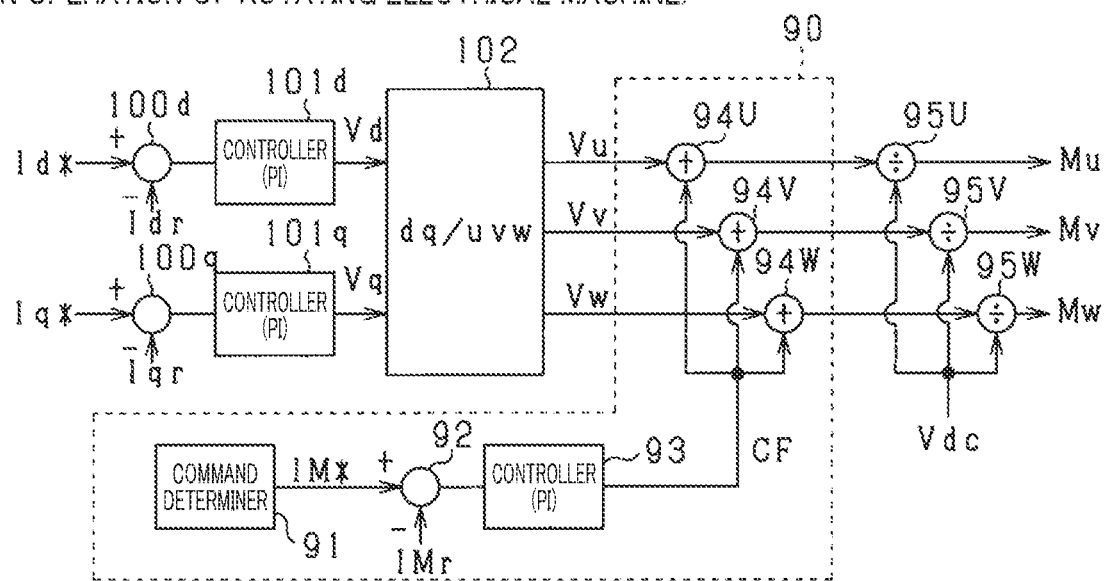
FIG. 14 is a block diagram which illustrates a functional structure of a controller when a rotating electrical machine is operating.

The energy management task may be executed when the vehicle is traveling as well as when at rest. FIG. 14 is a block diagram which represents the energy management task when the vehicle is moving. In FIG. 14, the same reference numbers as employed in FIG. 12 refer to the same parts for the sake of convenience.

The controller 70 includes the d-axis deviation calculator 100$d$, the q-axis deviation calculator 100$q$, the d-axis controller 101$d$, the q-axis controller 101$q$, and the three-phase converter 102.

The d-axis deviation calculator 100$d$ subtracts the d-axis current Idr from the d-axis command current Id* to derive the d-axis current deviation ΔId. The q-axis deviation calculator 100$q$ subtracts the q-axis current Iqr form the q-axis command current Iq* to derive the q-axis current deviation ΔIq. The d-axis command current Id* and the q-axis command current Iq*, as referred to herein, are determined as a function of the torque command value Trq* for the rotating electrical machine 40. The d-axis current Idr and the q-axis current Iqr are calculated as a function of the measured currents Ir measured by the phase current sensor 63 and an electrical angle of the rotating electrical machine 40. The electrical angle may be measured by a rotational position sensor, such as a resolver, or alternatively be mathematically calculated using a position sensor-less control mode.

The d-axis controller 101*d* calculates the d-axis voltage Vd that is a controlled parameter needed in the feedback mode to bring the derived d-axis deviation ΔId to zero. The q-axis controller 101*q* calculates the q-axis voltage Vq that is a controlled parameter needed in the feedback mode to bring the derived q-axis deviation ΔIq to zero. The d-axis controller 101*d* and the q-axis controller 101*q* may use a proportional-integral control mode as the feedback mode. A proportional-integral-derivative control mode may alternatively be used as the feedback mode.

The three-phase converter 102 calculates the U-phase command voltage Vu, the V-phase command voltage Vv, and the W-phase command voltage Vw in a three-phase fixed coordinate system using the d-axis voltage Vd, the q-axis voltage Vq, and the above-described electrical angle. The U-phase command voltage Vu, the V-phase command voltage Vv, and the W-phase command voltage Vw are in the form of signals (e.g., sine wave signals) and 120° out of phase with each other in terms of an electrical angle. The U-phase, V-phase, and W-phase superimposing units 94U, 94V, and 94W add the offset correction value CF to the U-phase command voltage Vu, the V-phase command voltage Vv, and the W-phase command voltage Vw measured by the three-phase converter 102, respectively, to calculate the above-described target U-phase, V-phase, and W-phase command voltages.

The above-described structure works to achieve transmission of electrical energy between the first storage battery 21 and the second storage battery 22. Specifically, when the command neutral point current IM* is in the positive direction, the energy is delivered from the first storage battery 21 to the second storage battery 22. Alternatively, when the command neutral point current IM* is in the negative direction, the energy is delivered from the second storage battery 22 to the first storage battery 21.

It is advisable in the energy management task that the efficiency of power exchange that is the ratio between an output energy from a first storage battery and an input energy delivered into a second storage battery from the first storage battery be high, in other wors, a loss of energy transmitted between the first and second storage batteries be low. To this end, the controller 70 in this embodiment has a structure configured to enhance the efficiency of energy exchange in the energy management task.

Figure 15:
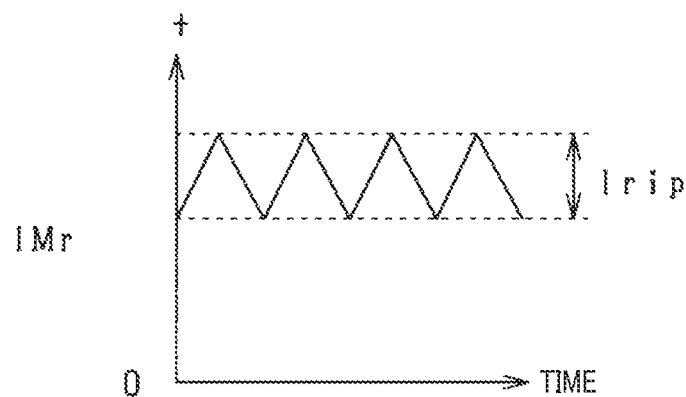
FIG. 15 is a time chart which represents a change in neutral point current with time.

The loss of energy occurring in execution of the energy management task involves a core loss generated in the rotating electrical machine 40. The core loss is known as arising from a ripple current Irip. Specifically, the core loss increases in proportion to the square of the ripple current Irip. The ripple current Irip, as referred to in this embodiment, appears as a variation in the neutral point current IMr illustrated in FIG. 15 which results from the turning on or off of the switches QUH to QWL. The ripple current Irip is expressed by Eq. e1 below.

$$Irip = \frac{Vbat}{L \times fsw} \quad \text{e1}$$

where Vbat is the terminal voltage at a storage battery, L is an inductance of the winding 41, fsw is a switching frequency in the inverter 30. Eq. e1 shows that a decrease in terminal voltage Vbat at the storage battery will result in a decrease in the ripple current Irip. The core loss in the rotating electrical machine 40 is, therefore, decreased by executing the energy management task when the terminal voltage Vbat at the storage battery is low.

In order to reduce the core loss in the energy management task, the controller 70 works to deliver electrical energy from one of the storage batteries 21 and 22 to the other only in a condition where the terminal voltage VB that is the higher of terminal voltages developed at the storage batteries 21 and 22 is lower than or equal to the reference voltage level Vp. The terminal voltage VB will also be referred to below as a voltage parameter.

Figure 16:
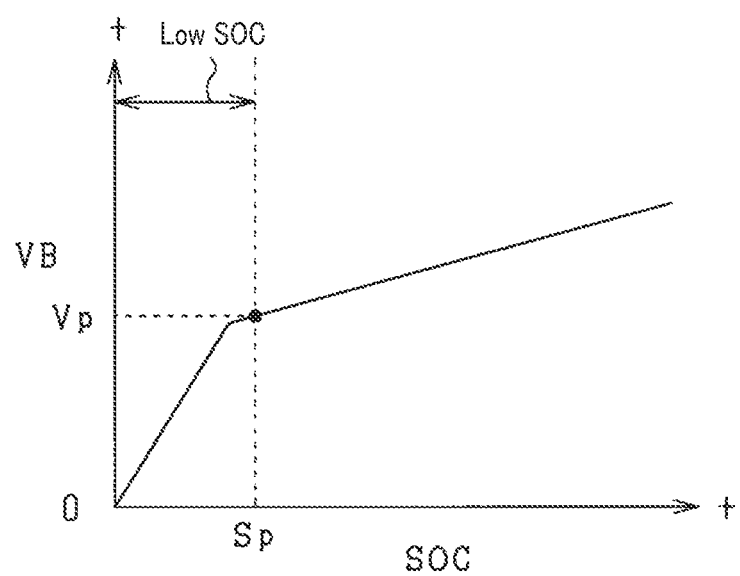
FIG. 16 is a view which shows a relation between a terminal voltage at a battery and a SOC (State-Of-Charge) thereof.

For instance, the reference voltage level Vp is determined based on the fact that the terminal voltage VB at each of the storage batteries 21 and 22 will be low when the SOC (State-Of-Charge) of a corresponding one of the storage batteries 21 and 22 is low. FIG. 16 represents a relation between the terminal voltage VB at the storage battery and the SOC of the storage battery. The terminal voltage VB and the SOC usually have a correlation therebetween wherein a voltage variation that is the amount of change in terminal voltage VB per unit variation in SOC of the storage battery depends upon the value of the SOC. There are two ranges: a high voltage variation range where the voltage variation is large, and a low voltage variation range where the voltage variation is small. When the SOC decreases to fall in the high voltage variation range, it may be a factor causing deterioration of the storage battery. In view of this fact, the level of the terminal voltage VB corresponding to a reference SOC Sp is determined as the reference voltage level Vp. The reference SOC Sp is preferably selected to be slightly higher than a value of the SOC corresponding to a lower limit of the low voltage variation range.

The transmission of electrical energy from one of the storage batteries 21 and 22 to the other is, as described above, achieved only in the condition where the terminal voltage VB that is the higher of terminal voltages at the storage batteries 21 and 22 is lower than or equal to the reference voltage level Vp, thereby reducing the ripple current Irip. This results in a decrease in the core loss in the execution of the energy management task.

The loss of electrical energy generated in the execution of the energy management task also involves copper losses occurring in the rotating electrical machine 40 and the switching device 31 and a switching loss generated in each of the switches QUH to QWL of the switching device 31 in addition to the core loss in the rotating electrical machine 40.

Figure 17:
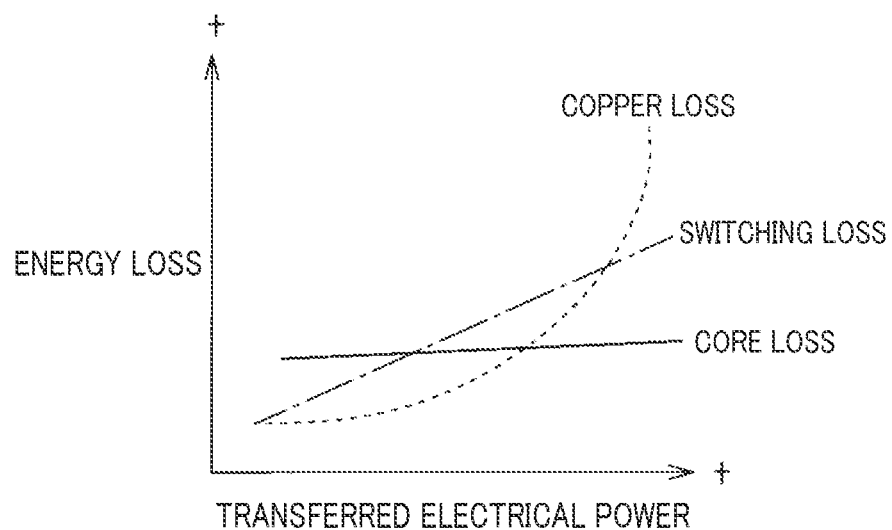
FIG. 17 is a view which shows a relation between a loss of energy occurring in execution of an energy management task and an exchanged electrical power.

The energy loss occurring in the execution of the energy management task will also be described below. FIG. 17 illustrates a relation between electrical power transferred between the first storage battery 21 and the second storage battery 22 (which will also be referred to merely as transferred power) and an energy loss in the execution of the energy management task. In FIG. 17, a solid line indicates the core loss generated in the rotating electrical machine 40. A broken line indicates the copper loss generated in the rotating electrical machine 40 and the switching device 31. A chain line indicates the switching loss occurring in each of the switches QUH to QWL of the switching device 31.

The magnitude of core loss in the rotating electrical machine 40 is usually constant regardless of the power transferred between the first storage battery 21 and the second storage battery 22. The magnitude of copper loss in the rotating electrical machine 40 and the switching device 31 increases proportional to the square of electrical energy transferred between the first storage battery 21 and the second storage battery 22. The magnitude of the switching device 3 increases in proportion to the power transferred between the first storage battery 21 and the second storage battery 22.

Consequently, this embodiment is designed to enhance the efficiency of power exchange in the energy management task in light of the core loss, the copper loss, and the switching loss.

Figure 18:
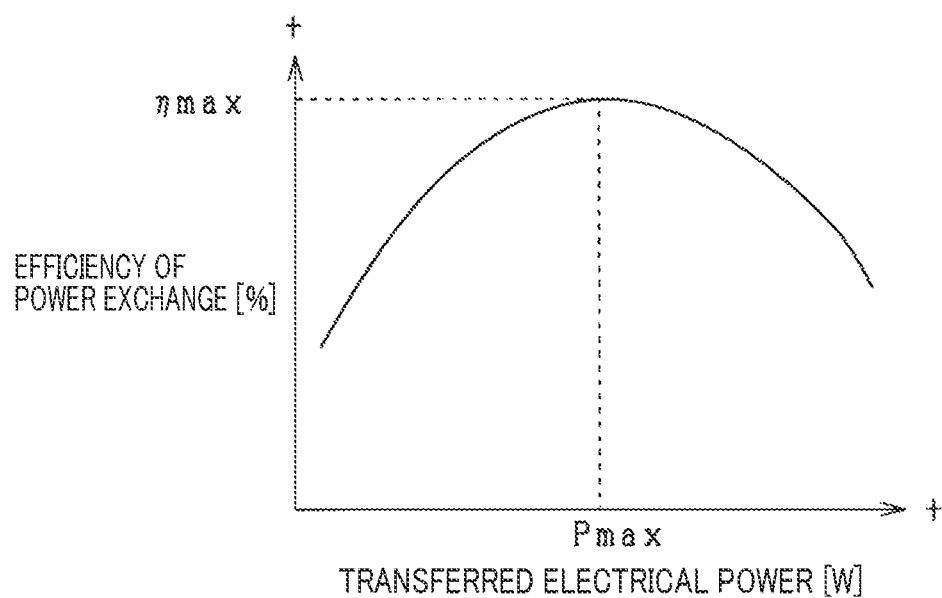
FIG. 18 is a view which shows a relation between an efficiency of power exchange and exchanged electrical power in terms of the number of phase windings through which electrical current flows.

FIG. 18 shows a relation the power transfer and the efficiency of power exchange in view of the core loss, the copper loss, and the switching loss. The efficiency of power exchange has a maximum value $\eta$max. In the following discussion, the power transferred at the maximum value $\eta$max of the efficiency of power exchange will be referred to as a maximum efficiency power Pmax. Usually, in a range where the transferred power is higher than the maximum efficiency power Pmax, the copper loss and the switching loss increase with an increase in transferred power, so that the higher the transferred power, the lower the efficiency of power exchange is. In a range where the transferred power is lower than the maximum efficiency power Pmax, the core loss is kept constant regardless of the magnitude of the transferred power, so that the lower the transferred power, the lower the efficiency of power exchange is.

The controller 70 works to execute the energy management task to bring the transferred power into agreement with a command power (i.e., target electrical power) W*. The controller 70 sets the command power W* to the maximum efficiency power Pmax. The maximum efficiency power Pmax is determined for each of the phases of the winding 41 through which the current flows in the execution of the energy management task.

Figure 19:
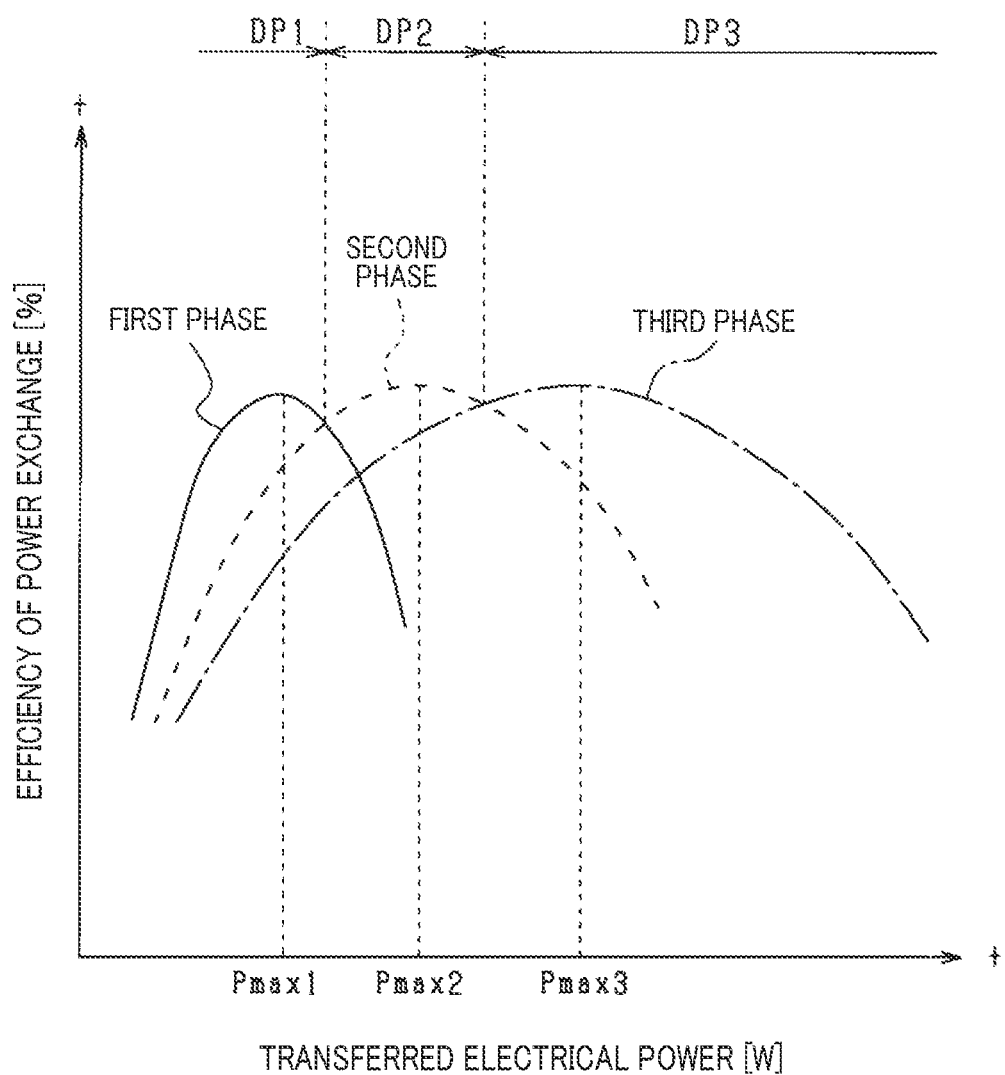
FIG. 19 is a view which shows a relation between exchanged electrical power and an efficiency of power exchange for different number of phase windings.

FIG. 19 represents a relation between the transferred power for each phase winding 41 through which the current is to flow in the execution of the energy management task and the efficiency of power exchange. A solid line indicates the case where the number of the phase windings 41 through which the current is to flow in the energy management task is one. A broken line indicates the case where the number of the phase windings 41 through which the current is to flow in the energy management task is two. A chain line indicates the case where the number of the phase windings 41 through which the current is to flow in the energy management task is three. The graph of FIG. 19 shows that the larger the number of the phase windings 41, the higher the maximum efficiency power Pmax, in other words, the maximum efficiency power Pmax1 when the number of the phase windings 41 through which the current is to flow in the energy management task is one is smaller than the maximum efficiency power Pmax2 when the number of the phase winding 41 through which the current is to flow in the energy management task is two, and the maximum efficiency power Pmax2 is smaller than the maximum efficiency power Pmax3 when the number of the phase winding 41 through which the current is to flow in the energy management task is three.

In light of the characteristics demonstrated in FIG. 19, the controller 70 is capable of changing the number of the phase windings 41 through which an electrical current should flow when there is no request to operate the rotating electrical machine 40. In this embodiment, the controller 70 calculates the number of the phase windings 41 to which the current is required to be applied as a function of the magnitude of required power Wreq.

For instance, the controller 70 calculates the required power Wreq to be transferred from one of the first storage battery 21 and the second storage battery 22 to the other to increase with an increase in difference between the terminal voltage VBH at the first storage battery 21 and the terminal voltage VBL at the second storage battery 22.

The controller 70 determines one of the maximum efficiency powers Pmax1, Pmax2, and Pmax3 as the command power W* as a function of the required power Wreq.

Specifically, when the required power Wreq lies in the first range DP1, the controller 70 calculates the maximum efficiency power Pmax1, as used when the number of the phase windings 41 through which the current is to flow in the energy management task is one, as the command power W*. The first range DP1 is a range in which the efficiency of power exchange when the number of the phase windings 41 through which the current is to flow in the energy management task is one is higher than that when the number of the phase windings 41 through which the current is to flow in the energy management task is another number. When the required power Wreq lies in the second range DP2, the controller 70 calculates the maximum efficiency power Pmax2, as used when the number of the phase windings 41 through which the current is to flow in the energy management task is two, as the command power W*. The second range DP2 is a range in which the efficiency of power exchange when the number of the phase windings 41 through which the current is to flow in the energy management task is two is higher than that when the number of the phase windings 41 through which the current is to flow in the energy management task is another number. When the required power Wreq lies in the third range DP3, the controller 70 calculates the maximum efficiency power Pmax3, as used when the number of the phase windings 41 through which the current is to flow in the energy management task is three, as the command power W*. The third range DP3 is a range in which the efficiency of power exchange when the number of the phase windings 41 through which the current is to flow in the energy management task is three is higher than that when the number of the phase windings 41 through which the current is to flow in the energy management task is another number. Note that the command neutral point current IM* is determined by the command determiner 91 to increase with an increase in the command power W*.

The controller 70 works to apply the current to a number of the phase windings 41 which corresponds to the calculated maximum efficiency power Pmax to execute the energy management task. Specifically, when the maximum efficiency power Pmax3 for three phases of the windings 41 is selected as the command power W*, the controller 70 controls on- and off-operations of ones (i.e., all in this embodiment) of the upper arm switches QUH, QVH, and QWH and the lower arm switches QUL, QVL, and QWL which are required to be activated for three phases in the inverter 30 in order to apply the current to three of the windings 41. Alternatively, when the maximum efficiency power Pmax2 for two phases of the windings 41 is selected as the command power W*, the controller 70 controls on- and off-operations of ones of the upper arm switches QUH, QVH, and QWH and the lower arm switches QUL, QVL, and QWL which are required to be activated for two phases in the inverter 30 in order to apply the current to two of the windings 41. Ones of the upper arm switches QUH, QVH, and QWH and the lower arm switches QUL, QVL, and QWL for the remaining one phase are kept off. Alternatively, when the maximum efficiency power Pmax1 for one phase of the windings 41 is selected as the command power W*, the controller 70 controls on- and off-operations of ones of the upper arm switches QUH, QVH, and QWH and the lower arm switches QUL, QVL, and QWL which are required to be activated for one phase in the inverter 30 in order to apply the current to one of the windings 41. Ones of the upper arm switches QUH, QVH, and QWH and the lower arm switches QUL, QVL, and QWL for the remaining two phase are kept off.

Alternatively, when a request is made to activate the rotating electrical machine 40, the controller 70 determines the maximum efficiency power Pmax3 as the command power W* and turns on or off ones (i.e., all in this embodiment) of the upper arm switches QUH, QVH, and QWH and the lower arm switches QUL, QVL, and QWL which are required to be activated for three phases.

Figure 20:
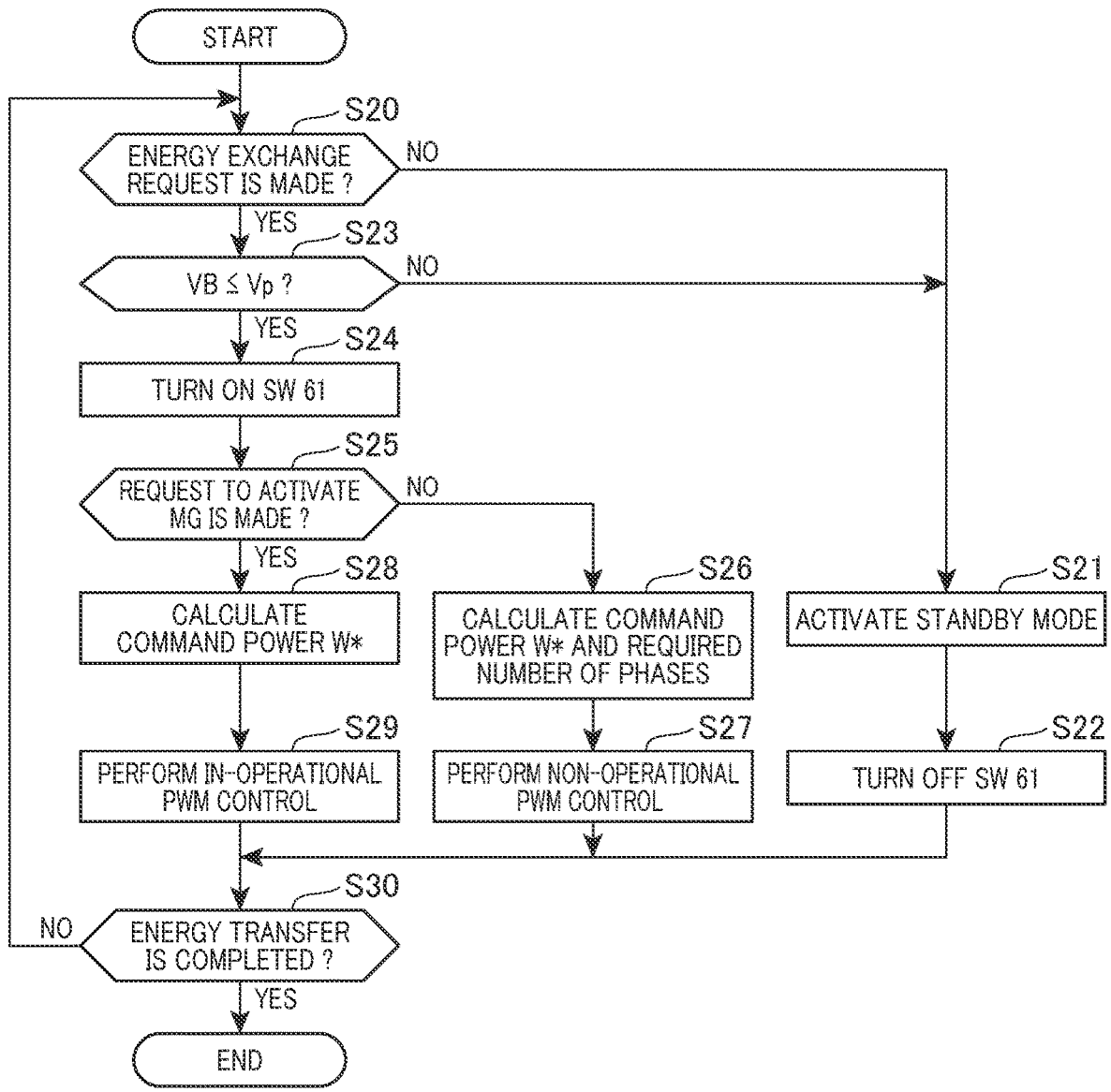
FIG. 20 is a flowchart of a sequence of logical steps of an energy management task.

FIG. 20 shows a sequence of logical steps of the energy management task performed by the controller 70 in given control cycles.

After entering the energy management task, the routine proceeds to step S20 wherein it is determined whether there is a request to transfer electrical energy from one of the first storage battery 21 and the second storage battery 22 to the other (which will also be referred to energy exchange). Specifically, when an absolute value of a difference between the terminal voltage VBH at the first storage battery 21 and the terminal voltage VBL at the second storage battery 22 is determined to be greater than a current deviation $\Delta V1$, the controller 70 concludes that the request has been made to transfer electrical energy from one of the first storage battery 21 and the second storage battery 22 to the other. The terminal voltage VBH at the first storage battery 21 and the terminal voltage VBL at the second storage battery 22 are derived from the monitoring unit 50.

If it is determined in step S20 that there is no request to transfer the energy from one of the first storage battery 21 and the second storage battery 22 to the other, then the routine proceeds to step S21 wherein a standby mode is entered. In the standby mode, the controller 70 keeps the switches QUH to QWL of the switching device 21 off. The routine then proceeds to step S22 wherein the connecting switch 61 is turned off. This blocks the electrical connection between the intermediate terminal B and the neutral point O.

Alternatively, if it is determined in step S20 that there is the request to transfer the energy from one of the first storage battery 21 and the second storage battery 22 to the other, then the routine proceeds to step S23 wherein it is determined whether the terminal voltage VB that is the higher of the terminal voltages VBH and VBL at the storage batteries 21 and 22 is lower than or equal to the reference voltage level Vp. If a NO answer is obtained in step S23, then the routine proceeds to step S21. Alternatively, if a YES answer is obtained in step S23, then the routine proceeds to step S24.

In step S24, the connecting switch 61 is turned on to achieve the electrical connection between the intermediate terminal B and the neutral point O. The routine then proceeds to step S25 wherein it is determined whether there is a request to activate the rotating electrical machine 40. In this embodiment, such a request includes a request to move the vehicle using torque produced by the rotating electrical machine 40.

Alternatively, if it is determined in step S25 that there is no request to activate the rotating electrical machine 40, then the routine proceeds to step S26 wherein the controller 70 calculates the command power W* and the number of the phase-windings 41 through which the current is required to flow. In this embodiment, the command power W* and the number of the phase-windings 41 through which the current is required to flow are determined as a function of the required power Wreq.

In step S27, the controller 70 executes a non-operational PWM control mode to transfer the energy between the first storage battery 21 and the second storage battery 22 using the determined command power W* and the determined phase-windings 41. The routine then proceeds to step S30.

Alternatively, if it is determined in step S25 that there is a request to activate the rotating electrical machine 40, then the routine proceeds to step S28 wherein the command power W* is calculated. In this embodiment, the maximum efficiency power Pmax3 for the three phases of the windings 41 is determined as the command power W*. The operations in step S26 and 28 serve as an electrical power calculator.

After step S28, the routine proceeds to step S29 wherein the current is applied to the windings 41 for three phases to drive the rotating electrical machine 40 and enters an in-operational PWM control mode to transfer the energy from one of the first storage battery 21 and the second storage battery 22 to the other based on the calculated electrical power. The routine then proceeds to step S30.

In step S30, it is determined whether the energy exchange has been completed. In this embodiment, when an absolute value of a difference between the terminal voltage VBH at the first storage battery 21 and the terminal voltage VBL at the second storage battery 22 is lower than or equal to a target value $\Delta V2$, the controller 70 decides that the energy exchange between the first storage battery 21 and the second storage battery 22 has been completed.

The above-described embodiment offers the following beneficial advantages.

The energy management task may use, unlike this embodiment, a switching device and a reactor for exchanging electrical energy between the storage batteries 21 and 22. Such a system, however, requires a large number of parts of the power conversion apparatus 11, thus resulting in an undesirable increase in size of the power conversion apparatus 11.

In this embodiment, when the terminal voltage VB that is the higher of the levels of the terminal voltages VBH and VBL developed at the storage batteries 21 and 22 is determined to be lower than or equal to the reference voltage level Vp, the controller 70, as described above, determines to turn on the connecting switch 61. The controller 70 works to execute the PWM control mode to apply a flow of electrical current to the intermediate terminal B between the first storage battery 21 and the second storage battery 22 in the condition where the connecting switch 61 is kept on. This causes the electrical energy to be transferred or exchanged from one of the first storage battery 21 and the second storage battery 22 to the other. The energy transfer or exchange is, therefore, achieved using the windings 41 and the switching device 31. This enables the power conversion apparatus 11 to be reduced in size.

The energy exchange is accomplished when the terminal voltages VBH and VBL appearing at the storage batteries 21 and 22 are lowered in level. Usually, the lower the terminal voltages VBH and VBL at the storage batteries 21 and 22, the smaller the ripple current Irip appearing as a variation in the neutral point current IMr will be. The smaller the ripple current Irip, the lower the core loss occurring at the windings 41. In light of this fact, the energy exchange is achieved in the condition where the terminal voltages VBH and VBL at the storage batteries 21 and 22 are low in level. This minimizes the loss of energy which usually arises in the energy exchange.

When it is determined that there is no request to activate the rotating electrical machine 40, and when the required power Wreq is low, the controller 70 decreases the number of phases, that is, the number of the windings 41 to which electrical current should be applied. This results in a decrease in magnetic flux passing through an iron core of the rotating electrical machine 40, which reduces the core loss generated in the rotating electrical machine 40.

The maximum efficiency power Pmax that is electrical power created as a function of the number of the phase windings 41 to which the current is applied and appears when the efficiency of power exchange has the maximum value ηmax is calculated as the command power W*. The command power W* is used to achieve the energy exchange between the first storage battery 21 and the second storage battery 22. This results in enhanced efficiency of power exchange in the execution of the energy management task.

The required power Wreq is increased with an increase in difference between the terminal voltage VBH at the first storage battery 21 and the terminal voltage VBL at the terminal voltage VBH. This results in a decrease in time for which the energy management task is executed.

Modifications of the Second Embodiment

The energy management task may not be designed in order to equalize the levels of the terminal voltages VBH and VBL developed at the first storage battery 21 and the second storage battery 22. For instance, the controller 70 determines whether there is a request to transfer the electrical energy from one of the first storage battery 21 and the second storage battery 22 to the other. If such a request is determined to have been made, the command determiner 91 calculates a target energy value indicating the magnitude of electrical energy required to be transferred from one of the first storage battery 21 and the second storage battery 22 to the other and then determines the command neutral point current IM* required to achieve the target energy value. More specifically, when the electrical energy is required to be transferred from the first storage battery 21 to the second storage battery 22, the command determiner 91 calculates the target energy value in the form of a positive value and determines the command neutral point current IM* to be high with an increase in the positive target energy value. Alternatively, when the electrical energy is required to be transferred from the second storage battery 22 to the first storage battery 21, the command determiner 91 calculates the target energy value in the form of a negative value and determines the command neutral point current IM* to be high with an increase in absolute value of the positive target energy value.

In the energy management task, the controller 70 may determine the command power W* to have a value other than the maximum efficiency power Pmax. In such a case, the controller 70 may calculate the required power Wreq as the command power W* and select one(s) of the phase-windings 41 to which the current should be applied in order to maximize the efficiency of power exchange in the energy management task executed using the calculated command power W*. Specifically, when the command power W* lies in the first range DP1, the controller 70 selects the number of phases of the windings 41 to which the current should be applied to be one. When the command power W* lies in the second range DP2, the controller 70 selects the number of phases of the windings 41 to which the current should be applied to be two. When the command power W* lies in the third range DP3, the controller 70 selects the number of phases of the windings 41 to which the current should be or required to be applied to be three.

The above system, as described above, selects the number of phases of the windings 41 to which the current needs to be applied in order to maximize the efficiency of power exchange in execution of the energy management task using the command power W*. This results in a decreased loss of electrical energy transferred between the first storage battery 21 and the second storage battery 22.

Instead of determining whether the terminal voltage VB that is the higher of levels of the terminal voltages VBH and VBL developed at the storage batteries 21 and 22 is lower than or equal to the reference voltage level Vp, the controller 70 may determine whether the higher of SOCs of the storage batteries 21 and 22 is lower than or equal to a SOC reference level Sp. In other words, the controller 70 works to transfer the electrical energy from one of the storage batteries 21 and 22 to the other when one of the SOCs of the storage batteries 21 and 22 are lower than or equal to the SOC reference level Sp. In this case, the SOC of each of the storage batteries 21 and 22 are used as a voltage parameter.

Third Embodiment

The third embodiment will be described below in terms of differences between itself and the first embodiment with reference to the drawings. The controller 70 in this embodiment is designed to perform a temperature elevating control task to control the temperature of the assembled battery 20. Specifically, when entering the temperature elevating control task, the controller 70 turns on the connecting switch 61 and then turns on or off the switches QUH to QWL to apply an alternating current to the first storage battery 21 and the second storage battery 22 through the switching device 31, the winding 41, and the connecting path 60. The power conversion apparatus 11 has the same equivalent circuit as that illustrated in FIG. 11 used in execution of the temperature elevating control task.

Figure 21:
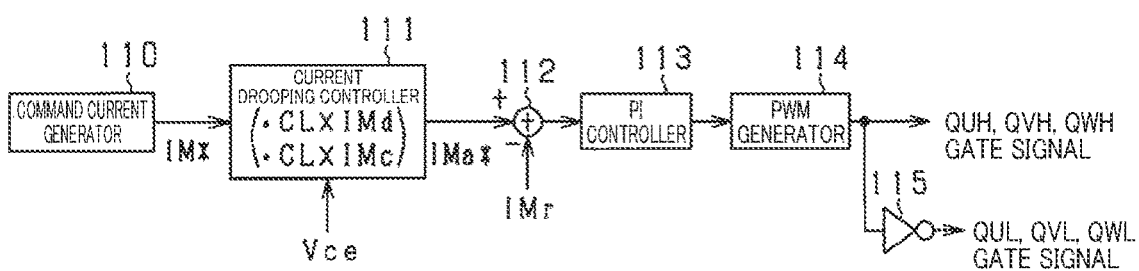
FIG. 21 is a block diagram which shows functional blocks executing a temperature elevating control task in the third embodiment.
Figure 22:
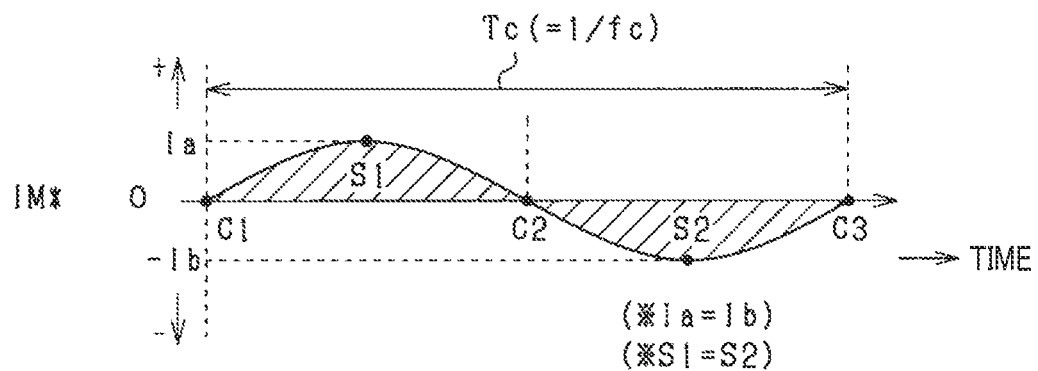
FIG. 22 is view which demonstrates how to determine a command neutral point current.

FIG. 21 is a functional block diagram used to execute the temperature elevating control task. The controller 70 is equipped with the command current generator 110. The command current generator 110 determines the command neutral point current IM*. The command neutral point current IM*, as referred to in this embodiment, is produced, as shown in FIG. 22, in the form of a sine wave. Specifically, the command neutral point current IM* is produced to have a positive value and a negative value which appear symmetrically with respect to a point (which will also be referred t as a zero crossing time) where the value of the command neutral point current IM* becomes zero in each cycle Tc of the command neutral point current IM*. Therefore, a time interval between the first zero crossing time C1 of the command neutral point current IM* and a second zero crossing time C2 of the command neutral point current IM* is, as can be seen in FIG. 22, equal to that between the second zero crossing time C2 and a third zero crossing time C3 of the command neutral point current IM*. The command neutral point current IM* is shaped to have an amplitude Ia on the positive side and an amplitude Ib on the negative side which are equal in absolute value or magnitude to each other.

The command neutral point current IM* is also shaped to have a first area S1 in a first region and a second area S2 in a second region which are equal to each other. The first area S1 in the first region is an area surrounded by an axis of time from the first zero crossing time C1 to the second zero crossing time C2 and a section of the command neutral point current IM* appearing on the positive side in each cycle Tc of the command neutral point current IM*. Similarly, the second area S2 in the second region is an area surrounded by the axis of time from the second zero crossing time C2 to the third zero crossing time C3 and a section of the command neutral point current IM* appearing on the negative side in each cycle Tc of the command neutral point current IM*.

The first area S1 and the second area S2 are selected to be equal to each other, thereby balancing a charging/discharging current between the first storage battery 21 and the second storage battery 22 in each cycle Tc. This minimizes a difference between the terminal voltage VBH developed at the first storage battery 21 and the terminal voltage VBL developed at the second storage battery 22 which will be increased due to execution of the temperature elevating control task.

The positive or negative direction of the command neutral point current IM* defined in this embodiment is equivalent to that of the neutral point current IMr discussed in the second embodiment.

Referring back to FIG. 21, the controller 70 is equipped with the current drooping controller 111. The current drooping controller 111 works to limit the command neutral point current IM* and output it in the form of a final command current IMa*. Specifically, the command neutral point current IM* is limited or corrected to have an absolute value thereof which is lower than or equal to a given limit value which will be described later in detail.

The controller 70 includes the current deviation calculator 112, the feedback controller 113, the PWM generator 114, and the inverting unit 115.

The current deviation calculator 112 works to subtract the neutral point current IMr measured by the current sensor 62 from the final command current IMa* to derive the neutral point current deviation ΔIM. The feedback controller 113 works to calculate a duty signal D used as an operated variable to bring the neutral point current deviation ΔIM, as calculated by the current deviation calculator 112, into agreement with zero in a feedback mode. The duty signal D contains a duty cycle for use in operating each of the upper and lower arm switches QUH to QWL. The duty cycle for each of the upper and lower arm switches QUH to QWL, as referred to therein, represents the ratio of an on-duration Ton to a switching cycle Tsw (i.e., Ton/Tsw). The feedback mode performed in the feedback controller 113 is, for example, a proportional-integral control mode.

The PWM generator 114 works to generate a gate signal for each of the upper arm switches QUH to QWH using the duty signal D derived by the feedback controller 113. The inverting unit 115 works to invert the logical value or high-low level of the gate signal for each of the upper arm switches QUH to QWH to generate the gate signal for each of the lower arm switches QUL to QWL. The gate signal, as referred to herein, is an on-off signal to turn on or off each of the switches QUH to QWL.

The above arrangements serve to turn on or off the switches QUH to QWL to create a flow of alternating current through the first storage battery 21 and the second storage battery 22 to elevate the temperature of the assembled battery 20. The terminal voltage Vce appearing at each cell of the assembled battery 20 is varied by execution of the temperature elevating control task. A large variation in the terminal voltage Vce may result in temporal overcharging or overdischarging of each cell of the assembled battery 20, which usually facilitates deterioration of each cell.

The controller 70 in this embodiment is designed to perform a current drooping control operation in order to ensure a temperature rising ability in the temperature elevating control task and protect the cells of the assembled battery 20 when a risk of overcharging or overdischarging of the cells of the assembled battery 20 is determined to have appeared. The current drooping control operation, as referred to in this embodiment, is to change the limit value, as used in limiting the command neutral point current IM*, as a function of the terminal voltage Vce developed at one(s) of the cells of the assembled battery 20 which has been overcharged or overdischarged. How to determine the limit value will be described below.

The controller 70 analyzes the terminal voltage Vce developed at each cell of the assembled battery 20 to determine whether each cell has been overcharged or overdischarged. Specifically, when determining that the terminal voltages Vce at all the cells of the assembled battery 20 lie in a reference voltage range, the current drooping controller 111 of the controller 70 concludes that none of the cells of the assembled battery 20 are overcharged or overdischarged. The reference voltage range is defined between a voltage lower limit Vmin and a voltage upper limit Vmax. When the terminal voltage Vce at one of the cells is lower than the voltage lower limit Vmin, the controller 70 determines that the one of the cells is overdischarged. Alternatively, when the terminal voltage Vce at one of the cells is higher than the voltage upper limit Vmax, the controller 70 determines that the one of the cells is overcharged. The controller 70 selects one of the cells which has been determined to be overdischarged as an overdischarge protecting target or one of the cells which has been determined to be overcharged as an overcharge protecting target. The terminal voltage Vce at each cell will also be referred to as a voltage parameter in this disclosure.

The limit value is determined by the current drooping controller 111. Specifically, the current drooping controller 111 calculates the current drooping coefficient CL as a function of the terminal voltage Vce at each cell. The current drooping coefficient CL is expressed by a numerical number between 0 and 1. The current drooping controller 111 multiplies predetermined initial discharge and charge limit values IMd and IMc by the current drooping coefficient CL to derive final discharge and charge limit values IMd and IMc, respectively.

Specifically, when it is determined that none of the cells are overdischarged or overcharged, the current drooping controller 111 sets the current drooping coefficient CL to one, so that the initial discharge and charge limit values IMd and IMc are used as the final discharge and charge limit values IMd and IMc as they are.

When one of the cells of the assembled battery 20 is determined as being overdischarged, the current drooping controller 111 analyzes the terminal voltage Vce at the one of the cells (i.e., the overdicharge protecting target) to set the current drooping coefficient CL to less than one. The current drooping controller 111 then changes the discharge limit value IMd for a command discharge current (i.e., the command neutral point current IM* provided for the overdischarge protecting target) and determines the product (i.e., CL×IMd) of the discharge limit value IMd and the current drooping coefficient CL as a final discharge limit value.

When one of the cells of the assembled battery 20 is determined as being overcharged, the current drooping controller 111 analyzes the terminal voltage Vce at the one of the cells (i.e., the overcharge protecting target) to set the current drooping coefficient CL to less than one. The current drooping controller 111 then changes the charge limit value IMc for a command charge current (i.e., the command neutral point current IM* provided for the overcharge protecting target) and determines the product (i.e., CL×IMc) of the charge limit value IMc and the current drooping coefficient CL as a final charge limit value.

The controller 70 determines an absolute value of the command neutral point current IM* to be lower than or equal to the finally derived discharge limit value IMd or the finally derived charge limit value IMc. Specifically, when an absolute value of the command discharge current is less than or equal to the value of CL×IMd, the current drooping controller 111 calculates the command discharge current directly as the final command current IMa*. Alternatively, when the absolute value of the command discharge current is higher than the value of CL×IMd, the current drooping controller 111 limits the absolute value of the command discharge current to the value of CL×IMd and determines it as the final command current IMa*. When an absolute value of the command charge current is lower than or equal to the value of CL×IMc, the current drooping controller 111 calculates the command charge current directly as the final command current IMa*. Alternatively, when the absolute value of the command charge current is higher than the value of CL×IMc, the current drooping controller 111 limits the absolute value of the command charge current to the value of CL×IMc and determines it as the final command current IMa*.

When one of the cells which is determined to be overdischarged belongs to the first storage battery 21, the command neutral point current IM* which is oriented in the positive direction is provided as the command discharge current. Alternatively, when one of the cells which is determined to be overdischarged belongs to the second storage battery 22, the command neutral point current IM* which is oriented in the negative direction is provided as the command discharge current. When one of the cells which is determined to be overcharged belongs to the first storage battery 21, the command neutral point current IM* which is oriented in the negative direction is provided as the command discharge current. Alternatively, when one of the cells which is determined to be overcharged belongs to the second storage battery 22, the command neutral point current IM* which is oriented in the positive direction is provided as the command discharge current.

Figure 23:
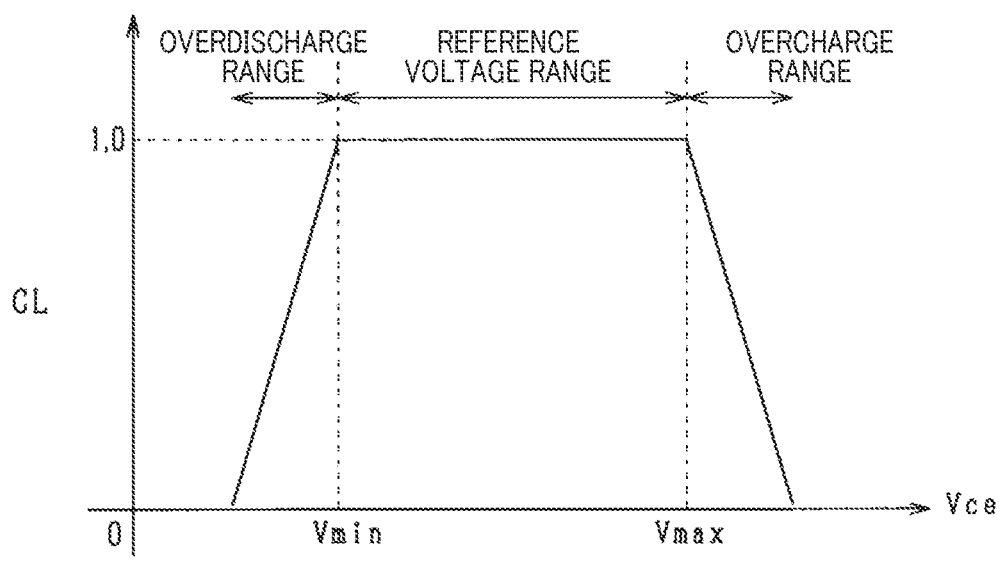
FIG. 23 is a view which demonstrates how to calculate a current drooping coefficient.

FIG. 23 shows how to calculate the current drooping coefficient CL. When the terminal voltages Vce at the cells of the assembled battery 20 are in the reference voltage range, the current drooping controller 111 determines the current drooping coefficient CL to be one. This causes the predetermined discharge and charge limit values IMd and IMc to be used as they are to control the command neutral point current IM*.

When the terminal voltage Vce at one of the cells has dropped below the voltage lower limit Vmin, the current drooping controller 111 decreases the current drooping coefficient CL linearly with a decrease in the terminal voltage Vce at the one of the cells. The current drooping coefficient CL may be decreased to reach zero. The current drooping controller 111 then multiplies the discharge limit value IMd by the current drooping coefficient CL, thereby limiting the absolute value of the command discharge current to be lower than or equal to the discharge limit value of CL×IMd. The discharge limit value of CL×IMd will be smaller than the peak of the command discharge current.

When the terminal voltage Vce at a first cell that is one of the cells of the assembled battery 20 is above the voltage upper limit Vmax, the current drooping controller 111 decreases the current drooping coefficient CL linearly with an increase in the terminal voltage Vce at the first cell. The current drooping coefficient CL may be decreased until it reaches zero. The current drooping controller 111 multiplies the charge limit value IMc by the current drooping coefficient CL, thereby limiting the absolute value of the command charge current to be lower than or equal to the decreased charge limit value of CL×IMc. The decreased charge limit value of CL×IMc is lower than the peak of the command charge current.

Figure 24:
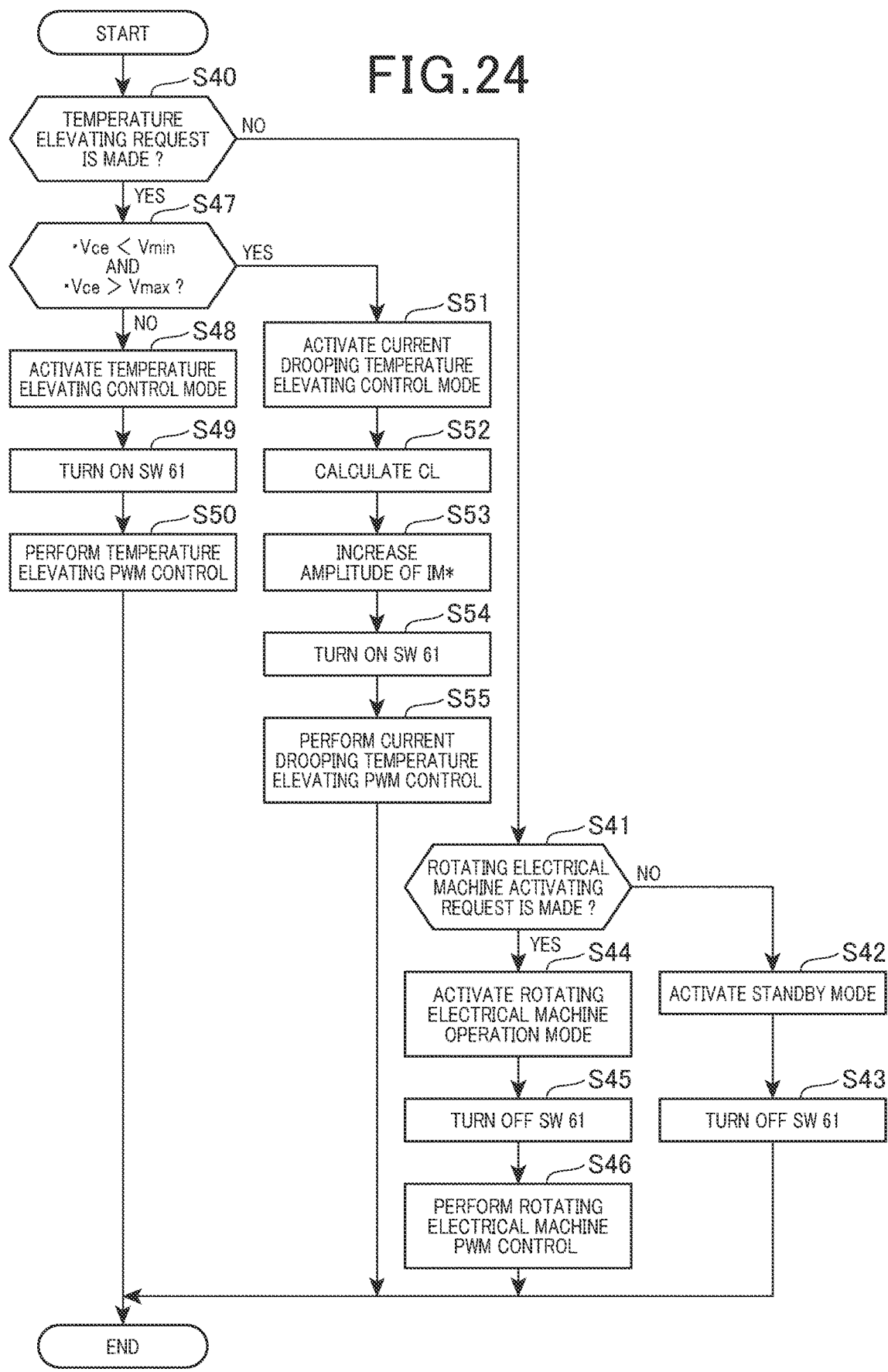
FIG. 24 is a flowchart of a sequence of logical step of a temperature elevating control task.

FIG. 24 represents a sequence of logical steps of the temperature elevating control task performed in given control cycles by the controller 70.

After entering the temperature elevating control task, the routine proceeds to step S40 wherein it is determined whether there is a heating request (which will also be referred to below as a temperature elevating request) to raise the temperature of the first storage battery 21 and the second storage battery 22. Specifically, when the temperature T of the assembled battery 20 is lower than or equal to the target temperature T*, it is determined that the heating request has been made to increase the temperature of the first and second storage batteries 21 and 22. The temperature T of the assembled battery 20 may be derived from the monitoring unit 50. The temperature T of the assembled battery 20 may be given by the temperature of one of the first storage battery 21 and the second storage battery 22 or an average of temperatures of the first storage battery 21 and the second storage battery 22.

If it is determined that there is no heating request, then the routine proceeds to step S41 wherein it is determined whether there is an operation request to activate the rotating electrical machine 40. The operation request includes a request to move the vehicle by operating the rotating electrical machine 40.

If it is determined in step S41 that there is no operation request to activate the rotating electrical machine 40, then the routine proceeds to step S42 wherein a standby mode is entered. The standby mode is to turn off the switches QUH to QWL of the switching device 31. The routine proceeds to step S43 wherein the connecting switch 61 is turned off to block electrical connection between the intermediate terminal B and the neutral point O.

Alternatively, if it is determined in step S41 that there is the operation request to activate the rotating electrical machine 40, then the routine proceeds to step S44 wherein a rotating electrical machine operation mode is entered. The routine proceeds to step S45 wherein the connecting switch 61 is turned off to block electrical connection between the intermediate terminal B and the neutral point O. The routine then proceeds to step S46 wherein a PWM operation mode is entered to execute a rotating electrical machine operation task. Specifically, the PWM rotating electrical machine operation task is to control on-off operations of the switches QUH to QWL of the switching device 31 to drive the rotating electrical machine 40, thereby rotating drive wheels of the vehicle so that the vehicle moves.

If it is determined in step S40 that there is the heating request, then the routine proceeds to step S47 wherein it is determined whether there is a risk that overcharge or overdischarge may occur in each of the cells of the assembled battery 20. Specifically, when the terminal voltage Vce at each of the cells is below the voltage lower limit Vmin, the corresponding cell is determined to be overdischarged. Alternatively, when the terminal voltage Vce at each of the cells is above the voltage upper limit Vmax, the corresponding cell is determined to be overcharged.

If it is determined in step S47 that none of the cells of the assembled battery 20 are overcharged or overdischarged, then the routine proceeds to step S48 wherein a temperature elevating control mode is entered. The routine proceeds to step S49 wherein the connecting switch 61 is turned on to establish electrical connection between the intermediate terminal B and the neutral point O through the connecting path 60.

After step S49, the routine proceeds to step S50 wherein a PWM temperature elevating control task is executed to increase the temperature of the first storage battery 21 and the second storage battery 22. The PWM temperature elevating control task is to turn on or off the switches QUH to QWL to bring the neutral point current IMr into agreement with the final command current IMa*. This provides a flow of alternating current between the first storage battery 21 and the second storage battery 22 through the switching device 31, the windings 41, and the connecting path 60, thereby elevating the temperature of the first storage battery 21 and the second storage battery 22. In the PWM temperature elevating control task, the current drooping coefficient CL, as calculated by the current drooping controller 111, is set to one. Specifically, the command neutral point current IM* is controlled by the predetermined limit value to calculate the final command current IMa*.

Alternatively, if it is determined in step S47 that the overcharge or overdischarge has occurred in one(s) of the cells, then the routine proceeds to step S51 wherein a current drooping temperature elevating control mode is entered.

The routine then proceeds to step S52 wherein the current drooping coefficient CL is calculated to be less than one as a function of the terminal voltage Vce of a first cell that is one of the cells which is determined to have been overcharged or overdischarged. Specifically, when the terminal voltage Vce at the first cell is lower than the voltage lower limit Vmin, the current drooping coefficient CL is decreased with a decrease in the terminal voltage Vce at the first cell. Alternatively, when the terminal voltage Vce at the first cell is above the voltage upper limit Vmax, the current drooping coefficient CL is decreased with an increase in the terminal voltage Vce at the first cell.

After step S52, the routine proceeds to step S53 wherein the amplitude of the command neutral point current IM* determined by the command current generator 110 is increased. The increase in amplitude of the command neutral point current IM* is achieved by increasing the positive amplitude Ia and the negative amplitude Ib illustrated in FIG. 22.

The routine proceeds to step S54 wherein the connecting switch 61 is turned on, thereby achieving electrical connection between the intermediate terminal B and the neutral point O through the connecting path 60.

The routine proceeds to step S55 wherein a PWM current drooping temperature elevating control task is executed to protect the cells of the assembled battery 20 without sacrificing the temperature elevating operation in the temperature elevating control task. When the first cell is determined to have been overdischarged, the PWM current drooping temperature elevating control task is to multiply the discharge limit value IMd by the current drooping coefficient CL calculated in step S52 to decrease the discharge limit value IMd. Alternatively, when the first cell is determined to have been overcharged, the PWM current drooping temperature elevating control task is to multiply the charge limit value IMc by the current drooping coefficient CL calculated in step S52 to decrease the charge limit value IMc. Afterwards, the final command current IMa* is determined to control the command neutral point current IM* to be less than the discharge limit value (i.e., CL×IMd) or the charge limit value (i.e., CL×IMc).

Subsequently, the switches QUH to QWL are turned on or off to bring the neutral point current IMr into agreement with the final command current IMa*, thereby applying a flow of alternating current between the first storage battery 21 and the second storage battery 22 through the switching device 31, the windings 41, and the connecting path 60 to elevating the temperature of the first storage battery 21 and the second storage battery 22.

Figure 25A:
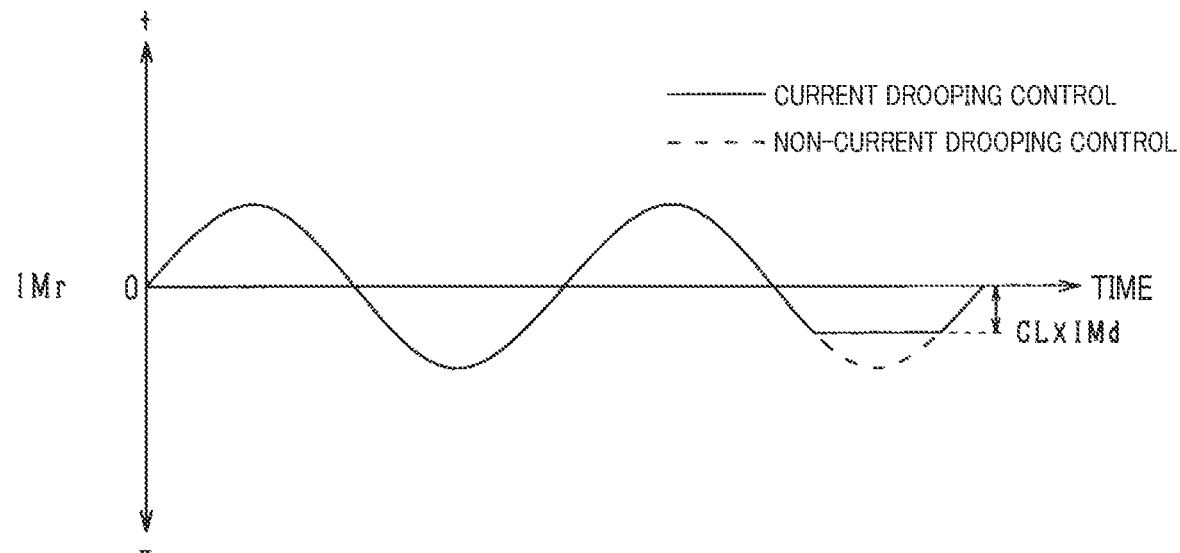
FIGS. 25($a$) and 25($b$) are time charts which demonstrate an example of a temperature elevating control task.
Figure 25B:
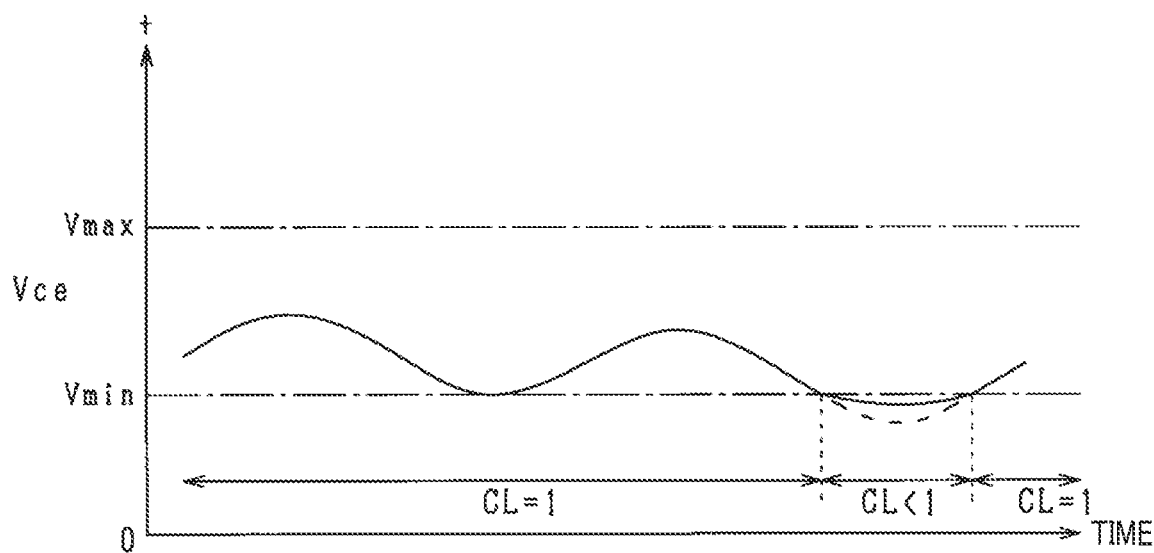

FIGS. 25(a) and 25(b) demonstrate an example of the temperature elevating control task executed when the first cell of the first storage battery 21 is determined to have been overdischarged. FIG. 25(a) illustrates a change in the neutral point current IMr with time. FIG. 25(b) illustrates a change in terminal voltage Vce at the first cell determined to have been overdischarged. Solid lines in FIGS. 25(a) and 25(b) denote the changes in the neutral point current IMr and the terminal voltage Vce at the first cell in execution of the current drooping control. Broken lines in FIGS. 25(a) and 25(b) denote the changes in the neutral point current IMr and the terminal voltage Vce at the first cell in the absence of the current drooping control. For the sake of convenience, FIGS. 25(a) and 25(b) omit the operation in step S53.

When the terminal voltage Vce at the first cell lies in the reference voltage range, the current drooping coefficient CL is set to one. When the terminal voltage Vce at the first cell is lower than the voltage lower limit Vmin, the current drooping coefficient CL is set to lower than one. This limits the absolute value of the command neutral point current IM* on the negative side to be less than or equal to the value of CL×IMd, so that the peak of the neutral point current IMr on the negative side will be the value of CL×IMd. For the sake of convenience, FIGS. 25(a) and 25(b) demonstrate the case where the neutral point current IMr is restricted to the fixed value of CL×IMd in a period of time for which the terminal voltage Vce at the first cell is below the voltage lower limit Vmin. Actually, however, the value of value of CL×IMd may be changed as a function of the terminal voltage Vce at the first cell in the period of time for which the terminal voltage Vce cell is below the voltage lower limit Vmin.

When the current drooping control is executed, it will cause the peak of the neutral point current IMr on the negative side to be limited to be lower than or equal to the value of CL×IMd, thereby reducing the variation in the terminal voltage Vce as compared with in the absence of the current drooping control. This minimizes a risk of overdischarge of the cells.

FIGS. 26(a) and 26(b) demonstrate a change in the neutral point current IMr with time in the presence and the absence of increase in amplitude of the command neutral point current IM* achieved by the operation in step S53 in FIG. 24 in a period of time for which the terminal voltage Vce at the first cell is below the voltage lower limit Vmin. Specifically, FIG. 26(a) represents a change in the neutral point current IMr in a comparative example where the amplitude of the command neutral point current IM* is not increased. FIG. 26(b) represents a change in the neutral point current IMr when the amplitude of the command neutral point current IM* is increased. In each of FIGS. 26(a) and 26(b), a solid line indicates a change in the neutral point current IMr with time, while a broken line indicates a change in the command neutral point current IM*.

In the case where the command neutral point current IM* is not increased, the neutral point current IMr and the command neutral point current IM* have waveforms illustrated in FIG. 26(a). The waveform of the command neutral point current IM* has the amplitude Ia1 on the positive side and the amplitude Ib1 on the negative side.

The increase in the command neutral point current IM* results in the neutral point current IMr and the command neutral point current IM* having waveforms illustrated in FIG. 26(b). The waveform of the command neutral point current IM* has the amplitude Ia2 on the positive side which is greater than the amplitude Ia1 of the command neutral point current IM* on the positive side illustrated in FIG. 26(a) and also has the amplitude Ib2 on the negative side which is greater than the amplitude Ib1 of the command neutral point current IM* on the negative side illustrated in FIG. 26(a).

The neutral point current IMr has the peak on the negative side which is kept by the current drooping control above the value of CL×IMd, while the amplitudes Ia2 and Ib2 of the command neutral point current IM* in FIG. 26(b) are increased to be greater than the amplitudes Ia1 and Ib1 of the command neutral point current IM* in FIG. 26(a), thereby causing an amount of change in the neutral point current IMr per unit time in FIG. 26(b) to be greater than an amount of change in the neutral point current IMr per unit time in FIG. 26(a). A region surrounded by a section of the neutral point current IMr on the negative side and the axis of time in FIG. 26(a), therefore, has an area F1, while a region surrounded by a section of the neutral point current IMr and the axis of time in FIG. 26(b) has an area F1+F2. The larger of the area of the region surrounded by a section of the neutral point current IMr and the axis of time, the higher the ability in increasing the temperature of the assembled battery 20.

The increase in amplitude of the command neutral point current IM* on the positive side causes the area of the region surrounded by a section of the neutral point current IMr on the positive side and the axis of time in FIG. 26(b) to also be greater than that surrounded by a section of the neutral point current IMr on the positive side and the axis of time in FIG. 26(a).

In the current drooping control, the increase in amplitude of the command neutral point current IM* enhances the ability in increasing the temperature of the assembled battery 20 as compared with when the amplitude of the command neutral point current IM* is not increased.

The above-described embodiments have features discussed below.

A structure A is provided which is designed as a power conversion apparatus which includes a rotating electrical machine and an inverter. The rotating electrical machine is equipped with star-connected windings. The inverter is equipped with series-connected units each of which includes an upper arm switch and a lower arm switch. The power conversion apparatus also comprises: (a) a connecting path which electrically connects a negative terminal of a first electrical storage, a positive terminal of a second electrical storage connected in series with the first electrical storage, and a neutral point of the windings together; (b) a connecting switch which is disposed in the connecting path and works to achieve an electrical connection of the negative terminal of the first electrical storage, the positive terminal of the second electrical storage, and the neutral point when the connecting switch is turned on and also block the electrical connection of the negative terminal of the first electrical storage, the positive terminal of the second electrical storage, and the neutral point when the connecting switch is turned off; (c) a determiner which works to determine whether the connecting switch is required to be turned on; (d) a controller which turns on the connecting switch when it is determined by the determiner that the connecting switch is required to be turned on to execute a switching control operation on the upper arm switches and the lower arm switches; and (e) a voltage obtainer which derives voltage parameters which indicate a terminal voltage appearing at the first electrical storage and a terminal voltage developed at the second electrical storage or correlates with the terminal voltages. The determiner determines whether there is a control request to apply a flow of electrical current between the first electrical storage and the second electrical storage. When determining that there is the control request, the determiner concludes that the connecting switch is required to be turned on. When it is determined by the determiner that the connecting switch is required to be turned on, and the voltage parameter of each of the first electrical storage and the second electrical storage derived by the voltage obtainer is determined to lie in a reference voltage range, the controller executes the switching control operation with the connecting switch kept on to provide a flow of electrical current between the first electrical storage and the second electrical storage through the inverter, the windings, and the connecting path. When it is determined that the connecting switch is required to be turned on, and a minimum value of the voltage parameters of the first electrical storage and the second electrical storage is determined to be lower than a lower limit of the reference voltage range, the controller executes the switching control operation to bring a discharge electrical current, as discharged from an overdischarge protecting target that is one of the first electrical storage and the second electrical storage which produces the minimum value of the voltage parameters, to be lower than that when the voltage parameters of the first electrical storage and the second electrical storage lie in the reference voltage range. Alternatively, when it is determined that the connecting switch is required to be turned on, and a maximum value of the voltage parameters of the first electrical storage and the second electrical storage is determined to be higher than an upper limit of the reference voltage range, the controller executes the switching control operation to bring a charge electrical current, as charging an overcharge protecting target that is one of the first electrical storage and the second electrical storage which produces the maximum value of the voltage parameters, to be lower than that when the voltage parameters of the first electrical storage and the second electrical storage lie in the reference voltage range.

A structure B is provided which is a modification of the structure A. In the structure B, the control request includes a temperature elevating request. The determiner determines whether there is the temperature elevating request to elevate the temperature of the first electrical storage and the second electrical storage. When the temperature elevating request is determined to have been made, the determiner decides to turn on the connecting switch. The controller works to apply a flow of electrical current between the first electrical storage and the second electrical storage in the switching control operation executed when the voltage parameters of the first electrical storage and the second electrical storage are determined to lie in the reference voltage range. The controller alternatively works to execute the switching control operation when the minimum value is determined to be below the lower limit to decrease the peak of a discharge current from the overdischarge protecting target to be lower than that when the voltage parameters of the first electrical storage and the second electrical storage lie in the reference voltage range. The controller alternatively works to execute the switching control operation when the maximum value is determined to be above the upper limit to decrease the peak of a charge current to the overcharge protecting target to be lower than that when the voltage parameters of the first electrical storage and the second electrical storage lie in the reference voltage range.

The structure B, as described above, serves to execute the switching control operation to apply an alternating current between the first electrical storage and the second electrical storage. When the minimum value of the voltage parameters of the first electrical storage and the second electrical storage is determined to be lower than the lower limit of the reference voltage range, the peak of the discharge current from the overdischarge protecting target is decreased. Alternatively, when the maximum value of the voltage parameters of the first electrical storage and the second electrical storage is determined to be above the upper limit of the reference voltage range, the peak of the charge current to the overcharge protecting target is decreased. This results in a decrease in variation in voltage at the overdischarge protecting target or the overcharge protecting target, which minimizes a risk of deterioration of the first electrical storage and the second electrical storage.

A structure C is provided which is a modification of the structure B. The structure C also includes a current obtainer which derives an electrical current flowing through the neutral point of the windings. When the connecting switch is decided to be turned on, and the voltage parameters of the first electrical storage and the second electrical storage are determined to lie in the reference voltage range, the controller executes the switching control operation to bring the electrical current, as derived by the current obtainer, into agreement with a command current. Alternatively, when the connecting switch is decided to be turned on, and the minimum value of the voltage parameters of the first electrical storage and the second electrical storage are determined to be below the lower limit of the reference voltage range, the controller limits an amplitude of a command discharge current to a discharge limit value which is lower than that of the command discharge current when the minimum value of the voltage parameters are determined not to be below the lower limit of the reference voltage range. The command discharge current is the command current and an electrical current to be discharged from the overdischarge protecting target. Alternatively, when the connecting switch is decided to be turned on, and the maximum value of the voltage parameters is determined to be above the upper limit of the reference voltage range, the controller limits an amplitude of a command charge current to a charge limit value which is lower than that of the command charge current when the maximum value of the voltage parameters is determined not to be above the upper limit of the reference voltage range. The command charge current is the command current and an electrical current charging the overcharging protecting target.

The structure C, as described above, works to execute the switching control operation to bring the electrical current derived by the current obtainer into agreement with the command current. When the minimum value of the voltage parameters of the first electrical storage and the second electrical storage is determined to be lower than the lower limit of the reference voltage range, the amplitude of the command discharge current is decreased to the discharge limit value. Alternatively, the maximum value of the voltage parameters of the first electrical storage and the second electrical storage is determined to be higher than the upper limit of the reference voltage range, the amplitude of the command discharge current is decreased to the charge limit value. This results in a decrease in peak of the discharge current from the overdischarge protecting target or the peak of the charge current to the overcharge protecting target.

A structure D is provided which is a modification of the structure C. Specifically, when the connecting switch is decided to be turned on, and the above-described maximum value is determined to be above the above-described upper limit, the controller serves to decrease the charge limit value with an increase in voltage parameter at the overcharge protecting target. Alternatively, when the connecting switch is decided to be turned on, and the above-described minimum value is determined to be below the above-described lower limit, the controller decreases the discharge limit value with a decrease in voltage parameter of the overdischarge protecting target.

The structure D, as apparent from the above discussion, works to determine the charge limit value or the discharge limit value as a function of the voltage parameter of each of the first and second electrical storages. This ensures the stability in decreasing the peak of the discharge current from the overdischarge protecting target or the peak of the charge current to the overcharge protecting target without sacrificing the exchange of electrical energy between the first electrical storage and the second electrical storage.

A structure E is provided which is a modification of the structure D. Specifically, when the connecting switch is decided to be turned on, and the above-described maximum value is determined to be above the above-described upper limit, the controller serves to increase the amplitude of the command charge current. Alternatively, when the connecting switch is decided to be turned on, and the above-described minimum value is determined to be below the above-described lower limit, the controller increases the amplitude of the command discharge current.

The limitation of the command current to the discharge limit value or the charge limit value leads to a risk that a flow of electrical current delivered to between the first electrical storage and the second electrical storage may be decreased. The structure E is, however, designed to increase the amplitude of the command discharge current when the minimum value of the voltage parameters of the first electrical storage and the second electrical storage is determined to be lower than the lower limit of the reference voltage range or alternatively increase the amplitude of the command charge current when the maximum value of the voltage parameters of the first electrical storage and the second electrical storage is determined to be above the upper limit of the reference voltage range. This ensures the stability in increasing the current flowing to between the first electrical storage and the second electrical storage to elevate the temperature of the first and second electrical storages and also minimizes the risk that each of the first and second electrical storage may deteriorate.

A structure F is provided which is a modification of the structure A. Specifically, the structure F includes a current obtainer which measures an electrical current flowing through the neutral point of the windings. The determiner determines whether the control request includes an energy exchanging request to transfer electrical energy from one of the first electrical storage and the second electrical storage to the other. When such a request is determined to have been made, the structure F decides to turn on the connecting switch. Specifically, when the connecting switch is decided to be turned on, and the voltage parameters of the first electrical storage and the second electrical storage are determined to lie in the reference voltage range, the controller executes the switching control operation to bring the current, as derived by the current obtainer, into agreement with a dc command current. When the minimum value of the voltage parameters of the first electrical storage and the second electrical storage is determined to be below the lower limit of the reference voltage range or the maximum value of the voltage parameters of the first electrical storage and the second electrical storage is determined to be above the upper limit of the reference voltage range, the controller limits the magnitude or intensity of the command current to a de limit value lower than that of the command current when the above condition is not met.

In the structure F, the controller is, as described above, designed to execute the switching control operation to bring the electrical current, as measured by the current obtainer, into agreement with the dc command current when the connecting switch is decided to be turned on, and the voltage parameters of the first electrical storage and the second electrical storage are determined to be lie in the reference voltage range. Alternatively, when the minimum value of the voltage parameters of the first electrical storage and the second electrical storage is determined to be lower than the lower limit of the reference voltage range or the maximum value of the voltage parameters of the first electrical storage and the second electrical storage is determined to be above the upper limit of the reference voltage range, the controller works to limit the intensity of the command current to the dc limit value which is lower than that of the command current when the above condition is not met. This reduces the intensity or value of electrical current transferred from one of the first electrical storage and the second electrical storage to the other, thereby resulting in a decrease in rate at which the voltage at the first electrical storage and the second electrical storage drops or rises. This minimizes a risk that the first electrical storage and the second electrical storage may be overdischarged or overcharged.

Beneficial advantages derived by embodying the above-described features will be discussed below.

When it is determined that there is the temperature elevating request to elevate the temperature of the assembled battery 20, the switches QUH to QWL are, as described above, turned on or off to apply a flow of ac current between the first storage battery 21 and the second storage battery 22 through the switching device 31, the windings 41, and the connecting path 60 with the connecting switch 61 kept on.

When the terminal voltage Vce at one (i.e., the first cell) of the cells of the assembled battery 20 is determined to be lower than the voltage lower limit Vmin, the amplitude of the command neutral point current IM* which will be a discharge current from the overdischarge protecting target that is one of the cells to be protected against overdischarge is decreased. Alternatively, when the terminal voltage Vce at one (i.e., the first cell) of the assembled battery 20 is determined to be higher than the voltage upper limit Vmax, the amplitude of the command neutral point current IM* which will be a charge current to the overcharge protecting target that is one of the cells to be protected against overcharge is decreased. This minimizes a risk that the terminal voltage Vce may be out of the reference voltage range, thereby reducing a risk that the first storage battery 21 and the second storage battery 22 may be deteriorated.

The current drooping coefficient CL is calculated as a function of the terminal voltage Vce appearing at one(s) (i.e., the overdischarge protecting target or the overcharge protecting target) of the cells of the assembled battery 20 to determine the degree by which the command discharge current or the command charge current is to be decreased. This results in a decrease in peak of the discharge current or the charge current without sacrificing the amount of energy transferred between the first storage battery 21 and the second storage battery 22 for elevating the temperature thereof.

The control or restriction of the command neutral point current IM* using the discharge limit value IMd or the charge limit value IMc may lead to a reduction in function to elevate the temperature of the assembled battery 20. This embodiment, however, works to increase the amplitude Ia and/or the amplitude Ib of the command neutral point current IM* when the terminal voltage Vce appearing at one(s) of the cells of the assembled battery 20 is determined to be lower than the voltage lower limit Vmin or higher than the voltage upper limit Vmax. This causes the amount of electrical current flowing to between the first storage battery 21 and the second storage battery 22 to be increased and also minimizes the risk of deterioration of the cells of the first storage battery 21 and the second storage battery 22.

Modifications of the Third Embodiment

The determination of the command neutral point current IM* may be achieved in a way other than illustrated in FIG. 22. The command neutral point current IM* may be determined to have a first section and a second section whose waveforms appear on the positive and negative sides to be symmetrical with respect to the zero crossing time in each cycle Tc. For instance, each of the first and second sections may be in a trapezoidal or rectangular shape.

The waveform of the command neutral point current IM* may not be shaped to be point-symmetrical with respect to the zero crossing time. For instance, The waveform of the command neutral point current IM* may be shaped to have a first section between the first zero crossing time C1 and the second zero crossing time C2 and a second section between the second zero crossing time C2 and the third zero crossing time C3 in each cycle Tc. The interval between the first zero crossing time C1 and the second zero crossing time C2 is set different from that between the second zero crossing time C2 and the third zero crossing time C3. The first area S1 in the first region and the second area S2 in the second region illustrated in FIG. 22 are equal to each other. This balances a charging/discharging current between the first storage battery 21 and the second storage battery 22 in each cycle Tc.

The controller 70 may alternatively be designed to determine whether there is a risk that the cells of the assembled battery 20 may be overdischarged or overcharged using the SOC of each cell of the assembled battery 20 instead of the terminal voltage Vce. For instance, when determining that the SOC of each cell of the assembled battery 20 is in a given reference SOC range, the controller 70 may determine that none of the cells of the assembled battery 20 are overdischarged or overcharged. The reference SOC range is defined by a reference SOC lower limit and a reference SOC upper limit. When the SOC of one (i.e., the first cell) of the cells is determined to be below the reference SOC lower limit, the controller 70 may determine that the first cell has been overdischarged. Alternatively, when the SOC of the first cell is determined to be above the reference SOC upper limit, the controller 70 may determine that the first cell has been overcharged. The SOS of each cell of the assembled battery 20 is used in this disclosure as the voltage parameter.

In step S47, when the SOC of one of the cells of the assembled battery 20 is determined to be below the reference SOC lower limit, it is determined that the one of the cells is overdischarged. Alternatively, when the SOC of one of the cells of the assembled battery 20 is determined to be above the reference SOC upper limit, it is determined that the one of the cells is overcharged. If either of the above conditions is met, then the routine proceeds to step S51. The SOC of each cell may be derived from the monitoring unit 50.

The command neutral point current IM* may be in the form of a dc current. In this case, the controller 70 works to control a supply of electrical energy from one of the first storage battery 21 and the second storage battery 22 to the other instead of the temperature elevating control task on the first storage battery 21 and the second storage battery 22. Such control may be achieved according to the program illustrated in FIG. 24.

Specifically, in step S40, it is determined whether a request (i.e., the energy exchanging request) has been made to transfer electrical energy from one of the first storage battery 21 and the second storage battery 22 to the other instead of making a determination of whether a request has been made to elevate the temperature of the first storage battery 21 and the second storage battery 22. The determination of whether the energy exchanging request has been made in step S40 may be achieved in the same way as in the second embodiment.

If it is determined in step S40 that the energy exchanging request has been made, then the routine proceeds to step S47 wherein it is determined whether each cell of the assembled battery 20 is overdischarged or overcharged.

If it is determined in step S47 that none of the cells are overdischarged or overcharged, then the routine proceeds to step S48 wherein an energy exchange control mode is entered instead of the temperature elevating control task. The routine then proceeds to step S49 wherein the connecting switch 61 is turned on.

The routine proceeds to step S50 wherein the controller 70 executes the PWM control mode to transfer electrical energy from one of the first storage battery 21 and the second storage battery 22 to the other. Specifically, the switches QUH to QWL are turned on or off with the connecting switch 61 kept on to apply a flow of electrical current between the first storage battery 21 and the second storage battery 22 through the switching device 31, the windings 41, and the connecting path 60. More specifically, when the command neutral point current IM* determined by the command current generator 110 is in the positive direction, electrical energy is supplied from the first storage battery 21 to the second storage battery 22. Alternatively, when the command neutral point current IM* determined by the command current generator 110 is in the negative direction, electrical energy is delivered from the second storage battery 22 to the first storage battery 21. An equivalent circuit and functional blocks thereof in this modification are the same as those executing the temperature elevating control task.

If it is determined in step S47 that one (i.e., the first cell) of the cells is overdischarged or overcharged, then the routine proceeds to step S51 wherein a current drooping energy exchange control mode is entered instead of the current drooping temperature elevating control task.

In step S52, the current drooping coefficient CL is calculated as a function of the terminal voltage Vce appearing at the first cell which is overdischarged or overcharged. Specifically, when determining that the terminal voltage Vce at the first cell is in the reference voltage range, the current drooping controller 111 sets the current drooping coefficient CL to one in the same way as when the command neutral point current IM* is in the form of an ac current. Alternatively, when determining that the terminal voltage Vce at the first cell is below the voltage lower limit Vmin or above the voltage upper limit Vmax, the current drooping controller 111 sets the current drooping coefficient CL to smaller than one.

The current drooping controller 111 multiplies the dc limit value IMdc used to restrict the command neutral point current IM* by the current drooping coefficient CL to derive the dc final limit value. The current drooping controller 111 works to restrict the absolute value of the command neutral point current IM* to be lower than or equal to a value of CL×IMdc. Specifically, when the absolute value of the command neutral point current IM* is already lower than or equal to the value of CL×IMdc, the current drooping controller 111 defines the command neutral point current IM* directly as the final command current IMa*. Alternatively, when the absolute value of the command neutral point current IM* is above the value of CL×IMdc, the current drooping controller 111 restricts the absolute value of the command neutral point current IM* to be equal to the value of CL×IMdc and defines it as the final command current IMa*.

After step S52, the routine proceeds directly to step S54 without executing the operation in step S53. In step S54, the connecting switch 61 is turned on. In step S55, the controller 70 executes the PWM control mode to transfer electrical energy from one of the first storage battery 21 and the second storage battery 22 to the other.

How to calculate the current drooping coefficient CL may be achieved in a way different from that shown in FIG. 23. The current drooping controller 111 may decrease the current drooping coefficient CL non-linearly as a decrease in the terminal voltage Vce at the first cell of the assembled battery 20 in a range where the terminal voltage Vce is blow the voltage lower limit Vmin. The current drooping controller 111 may also decrease the current drooping coefficient CL non-linearly as an increase in the terminal voltage Vce at the first cell of the assembled battery 20 in a range where the terminal voltage Vce is above the voltage upper limit Vmax.

Instead of deriving the current drooping coefficient CL using the terminal voltage Vce, the current drooping controller 111 may calculate the current drooping coefficient CL as a function of the SOC of one of the cells of the assembled battery 20. For instance, when the SOC lies in the reference SOC range, the current drooping controller 111 may set the current drooping coefficient CL to one. Alternatively, when the SOC is below the reference SOC lower limit, the current drooping controller 111 may decrease the current drooping coefficient CL with a decrease in the SOC. When the SOC is above the reference SOC upper limit, the current drooping controller 111 may decrease the current drooping coefficient CL with an increase in the SOC.

Instead of multiplying the limit value by the current drooping coefficient CL, the command neutral point current IM* may be multiplied by the current drooping coefficient CL. Specifically, when the terminal voltage Vce is lower than the voltage lower limit Vmin or higher than the voltage upper limit Vmax, the command neutral point current IM* is decreased, thereby decreasing the peak of the command neutral point current IM*.

The operation in step S53 may be omitted.

Instead of the structure illustrated in FIG. 21, the controller 70 may be designed to the structure shown in FIG. 27 to execute the switching control task. Specifically, the controller 70, as can be seen in FIG. 27, includes the hysteresis controller 116 instead of the feedback controller 113 and the PWM generator 114. The hysteresis controller 116 produces a gat signal for each of the upper arm switches QUH to QWH as a function of the neutral point current deviation ΔIM. Specifically, the hysteresis controller 116 produce the gate signal outputted to each of the upper arm switches QUH to QWH based on the neutral point current deviation ΔIM so as to bring the command neutral point current IM* to lie in a range of +ΔI defined based on the command neutral point current IM*.

Other Embodiments

Each of the above embodiments may be modified in the following way.

Figure 28:
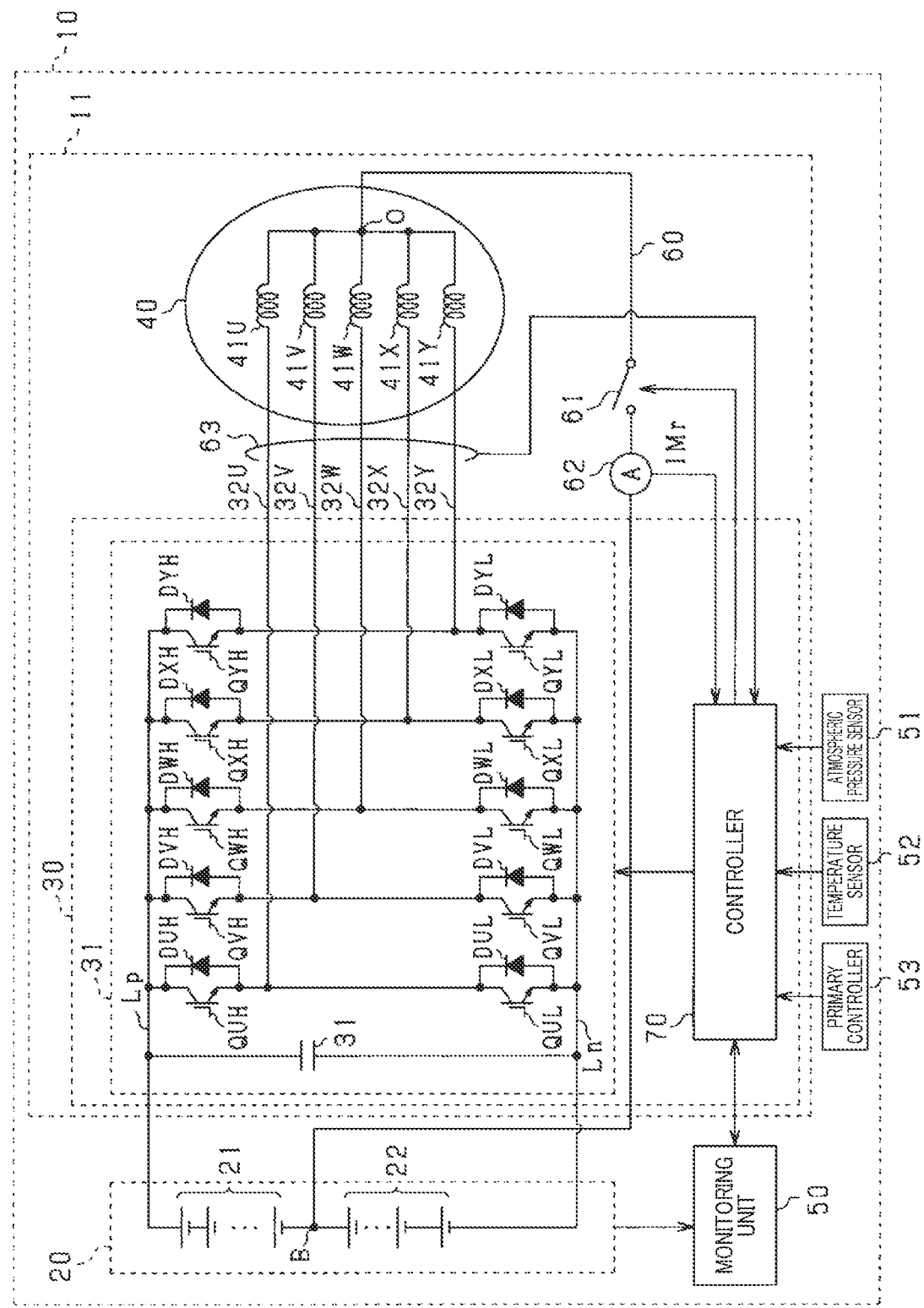
FIG. 28 is a view which illustrates a structure of a power conversion system for use with a rotating electrical machine and a switching device which are configured for five phases.

The rotating electrical machine 40 or the switching device 31 may be designed for five phases or seven phases other than three phases. FIG. 28 shows the power conversion system 10 for use with the rotating electrical machine 40 and the switching device 31 which are configured for five phases. In FIG. 28, the same reference numbers or symbols as those in FIG. 1 refer to the same parts for the brevity of disclosure.

In FIG. 28, the switching device 31 is additionally equipped with X-phase upper and lower arm switches QXH and QXL, diodes DXH and DXL connected to the X-phase upper and lower arm switches QXH and QXL, the Y-phase upper and lower arm switches QYH and QYL, and diodes DYH and DYL connected to the Y-phase upper and lower arm switches QYH and QYL. The rotating electrical machine 40 is additionally equipped with the X-phase winding 41X and the Y-phase winding 41Y. Similarly, the power conversion apparatus 11 is additionally equipped with the X-phase conductor 32X and the Y-phase conductor 32Y.

In the first embodiment designed to have the structure illustrated in FIG. 28, when the connecting switch 61 is kept off in the switch control task, a fraction of a terminal voltage at the assembled battery 20 is applied to the first phase winding 41a that is one of the U-phase winding 41U to the Y-phase winding 41Y. The maximum value Vm of the winding voltage at the first phase winding 41a is expressed by 4/5×Vdc. The maximum value Vm of the winding voltage in the case of five phases is, therefore, higher that in the case of three phases. The maximum value Vm is decreased to 1/2×Vdc by executing the switch control task with the connecting switch 61 kept on.

In the second embodiment, the maximum efficiency power Pmax is increased as a function of the number of phases of the windings 41 through which electrical current is required to flow even when the number of phases of the windings 41 is more than three. In other words, the maximum efficiency power Pmax4 in the case the number of phases of the windings 41 through which electrical current is required to flow is four is higher than the maximum efficiency power Pmax3 in the case the number of phases of the windings 41 through which electrical current is required to flow is three. The maximum efficiency power Pmax5 in the case the number of phases of the windings 41 through which electrical current is required to flow is five is also higher than the maximum efficiency power Pmax4 in the case the number of phases of the windings 41 through which electrical current is required to flow is four.

When the required power Wreq lies in the fourth range DP4, the controller 70 works to calculate the maximum efficiency power Pmax4 in the case of four phases as the command power W*. The fourth range DP4 is a range where the efficiency of power exchange when the number of phases of the windings 41 through which the current is to flow in the energy management task is four is higher than that when the number of phases of the windings 41 through which the current is to flow in the energy management task is another number. When the required power Wreq lies in the fifth range DP5, the controller 70 works to calculate the maximum efficiency power Pmax5 in the case of fifth phases as the command power W*. The fifth range DP5 is a range where the efficiency of power exchange when the number of phases of the windings 41 through which the current is to flow in the energy management task is five is higher than that when the number of phases of the windings 41 through which the current is to flow in the energy management task is another number.

The number of the cells of the first storage battery 21 may be different from that of the second storage battery 22.

Each of the upper and lower arm switches installed in the switching device 31 may be made of an n-channel MOSFET instead of an IGBT. In this case, each of the upper and lower switches is oriented to have a drain at the high potential side and a source at the low potential side.

The connecting switch 61 may not be made of a relay. For instance, the connecting switch 61 may include a pair of n-channel MOSFETs or IGBTs connected at sources thereof with each other.

The second and third embodiments may be designed not to have the atmospheric pressure sensor 51 or the temperature sensor 52.

The power conversion system 10 may be mounted in a mobile object, such as an aircraft or a watercraft as well as an automotive vehicle. In case of an aircraft, the rotating electrical machine 40 may be used as a power source for flying the aircraft. In case of a ship, the rotating electrical machine 40 is used as a power source for moving the watercraft. The power conversion system 10 may alternatively be mounted on an object other than a mobile object.

The operations of each controller referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium. The means for performing the functions of parts of the controller need not necessarily include software, but may be realized one or a plurality of hardware devices.

The present disclosure has been described above on the basis of embodiments and modifications, but the embodiments of the invention described above are for facilitating the understanding of the present disclosure and do not limit the present disclosure. The present disclosure can be modified and improved without departing from the drift and the scope of the claims, and the present disclosure include equivalents thereof.

What is claimed is:

1. A power conversion apparatus comprising:
a rotating electrical machine which includes windings which are star-connected;
an inverter which includes series-connected units equipped with upper arm switches and lower arm switches;
a connecting path which electrically connects a negative terminal of a first electrical storage, a positive terminal of a second electrical storage connected in series with the first electrical storage, and a neutral point of the windings together;

a connecting switch which is disposed in the connecting path and works to achieve an electrical connection of the negative terminal of the first electrical storage, the positive terminal of the second electrical storage, and the neutral point when the connecting switch is turned on and also block the electrical connection of the negative terminal of the first electrical storage, the positive terminal of the second electrical storage, and the neutral point when the connecting switch is turned off;

a determiner which works to determine whether the connecting switch is required to be turned on; and a controller which turns on the connecting switch when it is determined by the determiner that the connecting switch is required to be turned on to execute a switching control operation on the upper arm switches and the lower arm switches.

2. The power conversion apparatus as set forth in claim 1, wherein when determining that a degree of partial discharge occurring in a first phase winding that is one of the windings is greater than a permissible value, the determiner executes a determination task in which it is determined that the connecting switch should be turned on.

3. The power conversion apparatus as set forth in claim 2, further comprising an atmospheric pressure information obtainer which works to derive an atmospheric pressure around the rotating electrical machine or an altitude of the rotating electrical machine, and wherein in the determination task, the determiner determines whether the connecting switch should be turned on based on the atmospheric pressure or the altitude derived by the atmospheric pressure information obtainer.

4. The power conversion apparatus as set forth in claim 2, further comprising a temperature obtainer which drives a temperature of at least one of the windings or a temperature correlating the temperature of the at least one of the windings, and wherein in the determination task, the determiner determines that the connecting switch should be turned on when the temperature is higher than or equal to a temperature threshold value.

5. The power conversion apparatus as set forth in claim 2, further comprising a current obtainer which works to derive a current parameter which indicates an electrical current flowing through the windings or correlates with the electrical current, and wherein in the determination task, the determiner determines that the connecting switch should be turned on when the current parameter has crossed a current threshold value.

6. The power conversion apparatus as set forth in claim 2, further comprising a voltage obtainer which works to derive a voltage parameter which indicates a terminal voltage developed at the series-connected unit equipped with the first electrical storage and the second electrical storage or correlates with the terminal voltage, and wherein in the determination task, the determiner determines that the connecting switch should be turned on when the voltage parameter is higher than or equal to a voltage threshold value.

7. The power conversion apparatus as set forth in claim 1, further comprising a voltage obtainer which works to derive a voltage parameter which indicates a terminal voltage developed at each of the first electrical storage and the second electrical storage or correlates with the terminal voltage, and wherein when a higher of the voltage parameters derived by the voltage obtainer is lower than or equal to a voltage threshold value, the determiner determines that the connecting switch should be turned on, and when determining that the connecting switch should be turned on, the controller turns on the connecting switch to apply a flow of electrical current between the first electrical storage and the second electrical storage through the inverter, the windings, and the connecting path, thereby executing the switching control operation to transfer electrical energy from one of the first electrical storage to the other.

8. The power conversion apparatus as set forth in claim 7, further comprising a target electrical power calculator which calculates an electrical power transferred between the first electrical storage and the second electrical storage in execution of the switching control operation, and wherein the controller works to execute the switching control operation to bring an electrical power transferred between the first electrical storage and the second electrical storage into agreement with the target electrical power derived by the electrical power calculator and also to increase the number of phases of the windings through which electrical current is required to flow in the switching control operation with an increase in the target electrical power derived by the electrical power calculator.

9. The power conversion apparatus as set forth in claim 8, wherein the target electrical power is calculated by the electrical power calculator as a function of the number of phases of the windings through which the electrical current is required to be flow and also calculated to maximize an efficiency of power exchanged between the first electrical storage and the second electrical storage in execution of the switching control operation.

10. The power conversion apparatus as set forth in claim 8, wherein when the electrical power exchanged between the first electrical storage and the second electrical storage is brought into agreement with the target electrical power, the controller works to execute the switching control operation to have the number of phases of the windings through which the electrical current is required to flow so as to maximize an efficiency of power exchanged between the first electrical storage and the second electrical storage.

11. The power conversion apparatus as set forth in claim 8, wherein the electrical power calculator increases the target electrical power with an increase in difference between the voltage parameter of the first electrical storage derived by the voltage obtainer and that of the second electrical storage derived by the voltage obtainer.

12. The power conversion apparatus as set forth in claim 1, wherein the power conversion apparatus is mounted in a mobile object, and the rotating electrical machine works as a power source to move the mobile object.

* * * * *